US009861951B2

(12) United States Patent
Vu

(10) Patent No.: US 9,861,951 B2
(45) Date of Patent: Jan. 9, 2018

(54) DYNAMIC THERMOCHEMICAL PROCESS AND SYSTEM

(71) Applicant: Long D Vu, Tiburon, CA (US)

(72) Inventor: Long D Vu, Tiburon, CA (US)

( * ) Notice: Subject to any disclaimer, the term of this patent is extended or adjusted under 35 U.S.C. 154(b) by 0 days.

(21) Appl. No.: 15/140,469

(22) Filed: Apr. 28, 2016

(65) Prior Publication Data

US 2017/0312731 A1 Nov. 2, 2017

(51) Int. Cl.
*B01J 19/24* (2006.01)
*C01B 3/16* (2006.01)
*B01J 19/00* (2006.01)
*C10J 3/82* (2006.01)
*C10G 3/00* (2006.01)

(52) U.S. Cl.
CPC ......... *B01J 19/245* (2013.01); *B01J 19/0013* (2013.01); *C01B 3/16* (2013.01); *C10G 3/50* (2013.01); *C10J 3/82* (2013.01); *B01J 2219/00074* (2013.01); *B01J 2219/00132* (2013.01); *B01J 2219/00144* (2013.01); *C10J 2300/0969* (2013.01)

(58) Field of Classification Search
CPC .. B01J 19/2445; B01J 19/245; B01J 19/0033; B01J 19/0013; B01J 2219/00006; B01J 2219/00074; B01J 2219/00123; C01B 3/16; C01B 3/50; C01B 3/60; C10J 3/721; C10J 3/723; C10J 3/82; C10G 1/002; C10G 1/006
See application file for complete search history.

(56) References Cited

U.S. PATENT DOCUMENTS

2009/0324462 A1* 12/2009 Robinson .................. C10J 3/00
422/187
2014/0100395 A1* 4/2014 Felix ...................... C10G 1/006
585/240

* cited by examiner

*Primary Examiner* — Lessanework Seifu

(57) ABSTRACT

A dynamic thermochemical module is disclosed which includes an array of reactors, a network of interconnecting pipes and valves connected to each reactor in the array so that every reactor within the array can communicate to one another and other reactors in a different module having the same structure, a plurality of storage tanks connected to each reactor and interconnecting tubes and valves so that an output from each reactor is stored therein and distributed to each reactor in the array, a plurality of sub-functional modules connected to the array of reactors via the network of interconnecting tubes and valves, a plurality of condensers connected to the array of reactors, and a plurality of gas conditioning and storage and distribution sub-modules connected to the outputs of the condensers.

20 Claims, 20 Drawing Sheets

ABSTRACT## DYNAMIC THERMOCHEMICAL PROCESS AND SYSTEM

FIELD OF THE INVENTION

The present application relates to the thermochemical process of carbonaceous feedstocks as well as the system configuration and the implementation of the concept thereof. More particularly, the present application relates to a thermochemical system and process that can be dynamically adjusted depending on the operating conditions, the incoming feedstocks and the desired final products.

BACKGROUND ART

In order to reduce greenhouse gas to alleviate the issues of global warming and to prepare for the diminishing supply of fossil fuels, the use of renewable energy resources from waste materials is increasingly critical to the health of the earth since waste materials can be converted into renewable energy as well as hydrocarbon compounds for the chemical industry. Carbonaceous materials, such as biomass and solid wastes and the like, can be thermochemically converted to materials that can replace fossil fuels. These thermochemical processes are generally classified as combustion, pyrolysis and gasification.

During the last several decades, pyrolysis and gasification have been extensively researched to convert low value and highly distributed solid biomass and/or wastes into different products. These products include a bio-liquid known as bio-oil, a solid residue known as biochar, and a gaseous mixture known as synthetic gas. Synthetic gas or syngas mainly includes hydrogen ($H_2$), carbon monoxide (CO), methane ($CH_4$), carbon dioxide ($CO_2$) and relatively lower molecular weight of hydrocarbon compounds (tar). Furthermore, these products can be utilized as industrial feedstocks i.e. for combined heat and power (CHP) production, liquid fuels synthesis, chemical industry, hydrogen production, soils amelioration and carbon sequestration.

Gasification process provides a major pathway to convert biomass and/or waste into synthetic gas. The gasifying agents can be air, $O_2$, steam, $H_2$, $CO_2$, inert gases or mixtures thereof. Air, being a cheap and widely used gasifying agent, contains high amount of nitrogen (about 79 wt % in Air). However, air has the diluting effect and thus lowers the heating value of the produced syngas. If Oxygen is used as gasifying agent, the heating value of syngas will increase. However, the total costs will also increase because of the requirement of utilizing air separation unit to produce pure Oxygen. Partial combustion of biomass and/or waste with air or $O_2$ could supplies the required heat energy for drying as well as the endothermic gasification reactions [1 Basu P. *Combustion and gasification in fluidized.* Boca Raton, Fla.: CRC Press; 2006. p. 59-101].

If steam is used as the gasifying agent, the heating value and hydrogen content of syngas can be increased to about 10-15 $MJNm^{-3}$ [2, Rapagna S, Jand N, Kiennemann A, Foscolo P U. *Steam gasification of biomass in a fluidised-bed of olivine particles. Biomass & Bioenergy* 2000]. However, indirect or external heat supply is required to drive the endothermic thermochemical process, and the relatively high content of tar in the synthetic gas requires additional tar reforming/removing steps to avoid plugging-up in downstream processing equipment.

Conventionally, there are three main types of gasifiers: fixed bed, moving bed and fluidized bed gasifiers. Both fixed bed and moving bed gasifiers produce synthetic gas which normally entrained with substantial quantities of tar and/or char fines and/or particulates due to the low and non-uniform heat and mass transfer between solid biomass/waste and gasifying agent. In effect, this limits the processing capacity of the fixed bed and moving bed gasifiers to small scale. In operation, the tar condensation, entrained particulates and char fines in the condensed liquid, material agglomeration, and ash-related problems present major challenges to the operation of fixed bed and moving bed gasifiers as well as the utilization of end products. Therefore, effective solutions are needed to achieve safe and effective operations for these types of gasification. Fluidized bed gasifiers, which consist of hot inert materials such as sand, dolomite, olivine and the like, have been used widely as heat transfer agents in biomass fluidized bed gasification. Fluidized bed gasification process can achieve a high heating rate, uniform heating, and high processing capacity, thus enabling the utilization of fluidized bed gasification systems in medium and large scale plants. In addition, the relatively lower operating temperature of fluidized bed gasifiers in comparison to that of fixed bed gasifiers also help reducing the ash-related issues. However, due to the fluidization of biomass and heat transfer agents, fine particles resulted from attrition can be entrained in the produced syngas which required effective filtering in downstream process. [3 L. Wang et al. *Contemporary issues in thermal gasification of biomass and its application to electricity and fuel production-BIOMASS AND BIOENERGY* 32 (2008) 573-581]. Furthermore, the fluidizing condition imposes upper limits to the size of feedstock materials, normally in the range of less than about 3 mm. Consequently, pretreatment of feedstock materials such as pre-drying and size reduction are generally required. Depending on the nature of incoming feedstocks, the pretreatment process could be excessive, thus increasing the operational complexity and cost.

Tar has been identified as a major issue to the operation of thermochemical systems as well as the utilization of end products. During gasification, part of the biomass and/or waste is converted to char and tar instead of syngas. Effective utilization of syngas as a fuel for internal combustion engines, gas turbines and fuel cells for heat and power generation and as a feedstock for the synthesis of liquid fuels and chemicals depends highly on downstream gas conditioning technologies of the produced syngas.

Operating parameters such as gasification temperature, pressure and the equivalence ratio (ER, the ratio of $O_2$ required for gasification to $O_2$ required for stoichiometric combustion of a given amount of biomass) also have an effect on char and tar formation. High gasification temperature can achieve a high carbon conversion of the biomass and low tar content in syngas. However, high operating temperatures decrease the energy efficiency and increase the risk of ash sintering and agglomeration. Hasler and Nussbaumer [4] [Hasler P, Nussbaumer T. *Gas cleaning for IC engine applications from fixed bed biomass gasification. Biomass & Bioenergy* 1999; 16:385-95] observed that a 90% particle removal was easier to achieve than a 90% tar removal using the mechanical methods. Therefore, tar elimination is a key challenge for a successful application of biomass-derived syngas. Although nickel and other stable metal catalysts can almost completely remove tar, however, they are expensive, easily deactivated by coke formation, poisoned by $H_2S$ and sintered by ash melting at high temperature. Both alkali and dolomite catalysts are cheaper but they cannot remove all tar components in the syngas. Swierczynski et al. [5] developed a combined Ni-dolomite catalyst for steam reforming of tar using metallic nickel as an active phase grafted on dolomite. Their results showed that 97% of tar removal was obtained at a reforming temperature of 750° C. and a space velocity of 12,000 h$^{-1}$ and no obvious deactivation of catalyst were observed in 60 h tests.

Gasification provides a competitive way to convert diverse, highly distributed and low-value biomass and/or wastes to syngas for the combination of heat and power generation, synthesis of liquid fuels, and production of hydrogen ($H_2$). Co-firing of syngas in existing pulverized coal and natural gas combustors has been successfully commercialized. Fluidized bed gasification with steam and indirect or external heat supply demonstrated a promising way to improve the syngas yield and quality. Catalysts are widely used for syngas cleaning and for production of liquid fuels and $H_2$ from syngas. Nevertheless, improvement is still needed to improve syngas quality for its commercial uses in a high energy efficient heat and power generator i.e. gas turbines or fuel cells, and the production of liquid fuels, chemicals and $H_2$.

With respect to incoming feedstocks, the moisture content, the hydrogen content deficiency and the high level Oxygen content are other challenges in a typical thermochemical conversion process of biomass and/or waste. The evaporation of the moisture from the incoming feedstocks is generally considered as an undesired energy penalty and also reduces the conversion efficiency of the process. Furthermore, besides the moisture content issues, biomass and solid waste materials are generally deficient of hydrogen and contained high level of oxygen. These are among the main reasons for the undesirable characteristics of the produced bio-oil from biomass.

Pyrolysis is another major pathway for converting biomass and/or waste into fuels and/or chemicals in a thermochemical platform. One of the main products from a conventional fast pyrolysis process is bio-oil. Bio-oil generally is a dark brown liquid with properties that are acidic, immiscible with fossil fuels. It has relatively high oxygen content and water content in comparison to fossil fuels. Furthermore, as bio-oil ages, it becomes unstable due to polymerization and phase separation during storage. These are characteristics that cause bio-oil to be generally not compatible with the existing refinery equipment or processes which are conventionally used for processing crude oil to transportation fuels. In short, the major challenges in utilization of bio-oil are the instability of the highly reactive bio-oils during storage which limits the applications of bio-oils as biofuels; the high oxygen content in bio-oil, presents as oxygenated compounds, requires a sufficient amount of hydrogen for upgrading the bio-oil into transportation fuels via hydroprocessing which makes the process more expensive due to the costs of hydrogen production; the relative high water content and the immiscibility of bio-oil with petroleum crude make co-refining of bio-oil with petroleum crude difficult and the acidity of bio-oil presents corrosion issues to existing fuel-infrastructure and engines.

Therefore, bio-oils with improved properties, such as lower oxygen content, lower water content and less acidic, are highly desirable. The application of bio-oil as a replacement for traditional chemicals is always a challenge due to its complex composition. Bio-oil is a liquid consisting of several hundred chemical components. Most of the components are presented in low concentration. Therefore separation or fractionation of bio-oil is a promising approach to convert biomass and/or wastes to liquid fuels and/or chemical. At present, the use of biomass and/or waste resources to produce fungible fuels is continuously advancing.

To date, several research efforts to improve the properties of bio-oil have been focused toward post-pyrolysis treatment. This treatment upgrades the liquid bio-oils obtained from pyrolysis includes hydroprocessing and/or hydrotreating, catalytic cracking, thermal cracking and the like. On the other hand, less effort has been focused on in situ and/or integrated upgrading of pyrolysis vapor before it is condensed into liquid. This lack of progress in the integrated upgrading of pyrolysis vapor is mainly due to: (1) the complex and heterogeneous nature of the feedstock materials, (2) the complex thermochemical processes involved, and (3) the complexity of the properties of end products.

Conventionally, vapor phase upgraded bio-oil can be combined with hydrogen at 255°-410° C. and at about 2,000 psig pressure to convert the upgraded bio-oil to hydrocarbons, water, and gases over a fixed bed reactor. Depending upon the reactivity of the vapor phase upgraded bio-oil, two beds may be needed. The first bed is operated at the lower end of the temperature range to further reduce any remaining highly reactive compounds. The second bed is operated at the higher end of the temperature range, and possibly at a lower space velocity to allow complete deoxygenation. The ideal goal is that the vapor phase upgraded bio-oil is of high enough quality so that only a single hydrotreater is needed. After cooling, the products are separated and the hydrocarbon product is distilled into hydrocarbon gases (C4$^-$), gasoline range, diesel range, and heavy oil ranges materials. (Zacher et al. 2011).

ZSM-5 has been extensively studied for the upgrading of biomass pyrolysis vapors and its selectivity towards hydrocarbons is very well known. ZSM-5 had a more balanced performance with good selectivity towards hydrocarbons and an organics fraction yield on biomass. The oxygen was removed from the pyrolysis vapors in the form of $CO_2$, CO and $H_2O$ which resulted in a subsequent reduction of the total liquid and organic fraction yields due to the transfer of carbon in the gas products, the formation of water and the formation of coke deposits on the catalyst surface. Among zeolites, ZSM-5 has been extensively investigated as a catalyst for biomass pyrolysis and found to dramatically change the composition of the bio-oils by both reducing the amounts of oxygenated compounds via deoxygenation reactions and simultaneously increasing the aromatic species, producing an organic fraction (bio-oil) that can be upgraded to gasoline and diesel type fuel. In addition, the molecular weight of the bio-oil is decreased. The use of ZSM-5 catalyst is reported to reduce oxygen content in bio-oil from 33 to 13%. Oxygen removal was found to take place as $H_2O$ at lower temperatures and as CO and $CO_2$ at higher temperatures. The latter case is preferable, as more hydrogen would be accessible for hydrocarbon formation and consequently less carbon would deposit on the zeolite, while at the same time the water content of bio-oil is reduced. (Andrew J. Foster et. al, Optimizing the aromatic yield and distribution from catalytic fast pyrolysis of biomass over ZSM-5).

Referring to FIG. 1, a conventional fixed bed or moving bed gasifiers 100 is illustrated. There are multiple aspects of the operation which need to be considered. The major aspects are the moisture content, the physical dimension as well as the composition of the feedstock materials, the flows of the volatilized vapor relative to the flow of the feedstock materials i.e. updraft, downdraft or cross draft, the design and construction of the gasifiers, the operational parameters of the gasifier such as the type of processing agents i.e. air, oxygen, steam or other gases, the equivalent ratio which represents the ratio of the supplied oxygen to the stoichiometric oxygen for complete combustion in the case of air and/or oxygen is used as processing agent, the removal of the char, particulates and ash from the gasifier as well as from the produced synthetic gas (or syngas), the conditioning and utilization of the produced syngas.

In general, the complexity of the composition of the feedstock materials, the sequential nature of the devolatilization process with respect to the types of feedstock materials i.e. drying, devolatilization or pyrolysis, reduction and combustion, the complex evolution and reactive interaction of the volatilized vapor as well as the intrinsic mass and heat transfer limitation between feedstock materials and process gases have imposed several restrictions toward the desired operation of conventional gasifiers. As the results, the goal of stable operational conditions and the difficulties of increasing throughput capacity are the major challenges to the effort of commercializing large scale gasification plants.

Referring to FIG. 2, a catalytic hydropyrolysis system 200 taught by Terry L. Marker et. al ("Marker system"), US patent 2010/0256428 A1, is illustrated. Marker system 200 taught an approach which integrates the catalytic hydropyrolysis with hydroconversion and hydrocracking catalyst to produce fungible fuel from biomass. This approach also includes a specific way to produce hydrogen via steam reforming a portion of syngas which produced during the pyrolysis process combined with the pressure swing adsorption while maintaining a balance of the levels of decarboxylation, decarbonylation and hydrodeoxygenation to sustain the desired balanced process. This approach also requires the pretreatment of the incoming biomass materials to achieve the specific size to less than 3 mm to accommodate the fluidization process in addition to the consideration for the selection of fluidized bed materials i.e. Glass-ceramic sulfided NiMo, Ni/NiO, or Co-based catalysts in order to minimize the attrition effect. There are multiple configurations presented in the patent to teach the different combinations of the integration of the catalytic hydropyrolysis with hydroconversion and hydrocracking catalyst. In essence, each configuration provides a fixed process flow when the approach of Marker system 200 is implemented for the desired composition of the products.

Referring to FIG. 3, a phase and energy diagram 300 of water is illustrated. In thermochemical processes of carbonaceous materials, it has been known in the art that the moisture content of the feedstock materials is one of the important parameter with respect to the energy efficiency as well as the operational aspects of thermochemical processes. The moisture is often considered as an energy penalty due to the high energy required in vaporizing the moisture content of the feedstock materials. In practice, system designers often try to utilize the waste heat for the drying process to reduce the energy cost. In the total energy required for the drying process, the latent heat of vaporization generally requires a major portion of the total energy required.

Furthermore, when the vapor condenses, the latent heat will be released, thus, recovering the latent heat of vaporization could be an effective mean to minimize the energy penalty from the moisture content.

As a result of the above-mentioned issues and challenges, it is highly desirable to provide a thermochemical platform which is energy efficient, high degree of flexibility and high level of safety in operation, and economically feasible for the conversion of biomass and/or waste materials into high value and compatible end products.

SUMMARY OF THE INVENTION

These and other advantages of the present invention will no doubt become obvious to those of ordinary skill in the art after having read the following detailed description of the preferred embodiments, which are illustrated in the various drawing and figures.

We have now developed an innovative concept in thermochemical processing and system to provide the volumetric, staged processing capability for the thermochemical processing of heterogeneous-carbon based materials which include drying, pyrolysis, gasification, reduction, gas conditioning and vapor-liquid separation.

In addition, the present invention provides the capability of in-process selection and utilization of integrated sub-functional modules/reactors for the integrated vapor phase conditioning prior to condensing and/or utilization of the processed vapor as processing agents from one reactor to other reactors within the system. The sub-functional modules/reactors may include those utilized systems in gas processing i.e. cyclones, electrostatic precipitators (ESP), char fines and particulates hot filtering, dehalogenation, desulphurization, steam reforming, thermal cracking, catalytic cracking, water gas shift reaction, Boudouard reaction, hydrotreatment, hydrocracking, chemical looping and the likes. As the results, this invention provides improvement to the energy efficiency of the system and the quality of end products as well as the flexibility in the operational aspects of the implemented systems.

Furthermore, the present invention facilitates the thermochemical conversion, with or without pretreatment, of a wide range of heterogeneous materials (i.e. feedstock with various moisture content, non-uniform physical dimension and different composition such as municipal solid waste and the like). Another objective of the present invention is to provide the capability of in-process selection of different process flows to cope with the variation of the incoming feedstock and/or to optimize the production and/or to improve the quality of end products. The improved quality end products include bio-oil with lower water content and/or lower oxygen content and/or less acidic and/or more stable as compared to bio-oil from conventional fast pyrolysis; synthetic gas having better heating value in comparison to producer gas from conventional gasification using air as oxidized agent; and carbonaceous residue (i.e. bio-char) having a higher surface area as compared to conventional carbonization process.

Another objective of the present invention is to provide a mechanism for the recovery and in-process utilization of the energy content of the vaporized moisture emanating from the feedstocks as well as the sensible heat energy of the high temperature gases produced during operation. This improves the energy efficiency of the thermochemical processing system while simultaneously recovers and treats the waste water from the moisture content of feedstocks. As a result, waste water treatment for thermochemical processing can be reduced.

Yet another objective of the invention is to provide a semi-automated and/or fully automated operation via software controlled programs in communication with a sensors and feedback network integrated into a multileveled system of interconnecting pipes and controlled valves. Furthermore, the integrated sensors i.e. temperature, pressure, flow rate and the like, and the feedback network provide the real time process monitoring and controlling functions as well as the capability of proactive maintenance function i.e. by monitoring the pressure drop and/or the flow rate across connecting pipes, any potential plugging or leaking of the pipes can be detected and alarmed before the completed plugging or severe leakage of the pipes occur via the increase of the pressure drop and/or the change of the flow rate. This proactive maintenance capability provides higher level of safety for the operation of the implemented system and reduces maintenance cost.

Another objective of the present invention is to implement the inventive concept into a single large array of reactors or a group of smaller array of reactors or multiple groups of array of reactors or any combination thereof. In implementation, the modularized system configuration of the inventive concept and system provide the operational capacities for both small distributed scale as well as large industrial scale.

Another objective of the present invention is to provide a system comprising:

A plurality of reactors and/or groups of reactors which are arranged in a matrix format and integrated into a multilevel-multiplexing interconnecting pipes and controlled valves network which includes a plurality of multiplexing (MUX) modules. The aforementioned systems are designed to provide the volumetric, staged operation; the in-process selection and utilization of sub-functional modules/reactors; and the in-process selection of different thermochemical process flows with respect to the implemented thermochemical platform. Different types and configurations of reactors known in the art can be configured within the matrix; preferably, the reactors should be designed and configured to facilitate the pressurized and/or atmospheric and/or vacuum operations which depend on the incoming feedstocks and/or the desired end products of the thermochemical process. Furthermore, the reactors should be capable to operate with different processing agents such as air, $O_2$, steam, $CO_2$, other inert gases and combination thereof.

A plurality of sub-functional reactors/modules which include those utilized systems in gas processing i.e. cyclones, ESP, char fines and particulates hot filtering, dehalogenation, desulphurization, steam reforming, thermal cracking, catalytic cracking, water gas shift reaction, Boudouard reaction, hydrotreatment, hydrocracking, chemical looping and the like. The sub-functional reactors/modules are appropriately situated and interconnected with each other and with the reactors within the matrix to perform their intended functions such as conditioning and/or utilization of process gases.

A sensors network comprises of temperature sensors, pressure sensors, gases sensors, mass flow controller (MFC), pressure regulators, and feedback loops to facilitate the operation as well as the monitoring and/or controlling of individual processing tasks. These sensors based network and the feedback loops, in combination with the motorized valves of the multilevel-multiplexing interconnect piping and controlled valves network, also provides the capability of partial automatic and/or fully automatic operation for the implemented system via software programs i.e. programmable logic controller (PLC). In addition, self-diagnostic and proactive maintenance programs can also be implemented.

A multiple condensing sub-systems designed to separate the condensable and non-condensable components of the processed gases. The condensing sub-system can also be designed as a heat recovery steam generator to facilitate the steam generation via heat exchange with high temperature process gases. Furthermore, a fractional condensing sub-system can be employed to further segregate the condensed liquid into sub-groups of condensed liquids for subsequent processing and/or utilization.

Non-condensable gas conditioning, storage and distribution modules and multiple burners configured to provide the required heat energy for the endothermic process steps during thermochemical processes and/or generate the pressurized steam and superheated steam and/or provide the heat energy for other pressurized gases as required for the operation of the matrix and/or provide the required heat energy to sub-functional modules/reactors.

In operation, individual sub-functional module can function as individual and/or in combination with other sub-functional module(s) with respect to individual reactor or multiple reactors to perform a single and/or a combination of different selected process steps, as examples without limitation such as the sub-functional modules for thermal reforming, steam reforming, water gas shift, catalytic reforming and/or a combination thereof can be selected via the controlled valves of the multilevel-multiplexing interconnect piping and controlled valves network for the processing step of reduction and/or elimination of tars, or the conversion of processed syngas from one reactor in the matrix into enriched hydrogen syngas via the steam reforming and water gas shift reactors, which are connected and operated in series, and then redirect the enriched hydrogen gas via the MUX network back to the inlet of other reactors to affect the hydropyrolysis operation for the receiving reactors in the matrix. Subsequently, the output syngas from the receiving reactors can be directed to the hydrotreating and/or hydrocracking reactors via the MUX network to affect the hydrodeoxygenation and/or hydrocracking operations of the produced syngas. The output from the hydrotreating and/or hydrocracking reactors can then be distilled to produce high quality end products i.e. gasoline range, diesel range and other condensates.

Another advantage of the present innovative concept is the volumetric processing capability for individual stage of thermochemical process including the drying stage, the devolatilization or pyrolysis stage, and the gasification stage. When combining the above with the parallel processing capability which is provided via the MUXs in the multilevel-multiplexing interconnect piping and controlled valves network, significant improvement of processing throughput can be realized.

Furthermore, the implemented systems according to this innovative concept inherently possess improved energy efficiency due to the built in mechanism for the recovery and utilization of latent and sensible heat energy from the evaporated moisture, the heat recovery from the high temperature processed gas to generate additional steam during the condensing process, and the sensible heat recovery from the hot solid residue during the cooling process.

Yet another advantage of the present invention includes the capability to control and change process conditions on-demand and in-process with respect to the operating conditions and/or process parameters of individual reactor and/or a group of reactors via the combination of a multi-staged superheater module with processing agent and pressure sources i.e. steam boiler, pressurized oxygen, pressurized air etc. This capability is facilitated via the multilevel-multiplexing interconnect piping and controlled valves network.

In summary, the integration of multiple reactors and sub-functioning modules into a matrix format combine with a communication networks of means such as the multilevel-multiplexing interconnect piping and controlled valves network for the transportation and multiplexing distribution of process gases, and the sensors and feedback networks for the monitoring and controlling of operation, provides significant advantages to the flexibility and capability of the implemented systems to produce products with desired properties from processing heterogeneous, carbon-based feedstocks. In addition, the implemented system also provides the capability to partially automate and/or fully automate the operation of the system via the installed sensors i.e. temperature and pressure sensors, the feedback loops and software programs. The non-exhausted list of major advantages of the present innovative concept is as follows:

Provide the large scale with high up time processing capacity without the inherent severity and/or limitation in design, manufacturing, transportation, installation, operation and maintenance of large reactors.

Provide the independent on-demand, in-process control of process parameters i.e. temperature, pressure, heating rate, processing agents (air or oxygen or steam or $CO_2$ or inert gas or combinations thereof) and process flows for individual stages of thermochemical process (i.e. drying, devolatilization or pyrolysis, gasification and oxidation).

Provide the capability of multiplexing the transportation of processed gases during operation of individual stages of thermochemical processes with respect to individual reactor and/or a group of reactors and/or multiple groups of reactors.

Provide the capability to operate multi-type thermochemical processes simultaneously i.e. high temperature steam gasification is performed in one reactor to produce $H_2$ rich synthetic gas along with superheated steam. All can be used as the reactive processing agent in other reactors, via the multilevel multiplexing interconnect piping and controlled valves network, to affect the hydropyrolysis process in the receiving reactor(s) for producing saturated, low oxygen content vapor compounds which results in low oxygen content condensates.

The implemented system of the present invention can be designed to operate in batch, semi-continuous and continuous modes with appropriate mechanical means to affect the transportation and distribution of inputs and outputs materials.

The implemented system enables the sensor based process monitoring and controlling thus leads to a high degree of automated operation with software driven processing capability. In addition, self-diagnostic and proactive maintenance software programs can also be implemented.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Now referring to FIG. 4, a schematic diagram of a dynamic thermochemical processing system 400 (hereinafter referred to as "system 400") in accordance with an embodiment of the present invention is illustrated. In this exemplary embodiment, system 400 includes: a group of reactors 1A, 1B, 1C, 1D; a group of multiplexing (MUX) tanks 2A, 2B, 2C, 2D with associated controlled valves which functioning as switches;
a group of sub-functional module/reactors 3A, 3B, 3C, 3D; a group of condensers/heat recovery steam generators (C-HRSG) 4A, 4B, 4C, 4D and steam distribution tanks 8A, 8B, 8C; a group of gas processing/storage/distribution modules 5A and 5B; a processing agent and pressure source (steam boiler) 6; a group of superheaters 7A, 7B, 7C; and all the above components are interconnected and communicated via a multilevel-multiplexing interconnect piping and controlled valves network 9.

Figure 1:
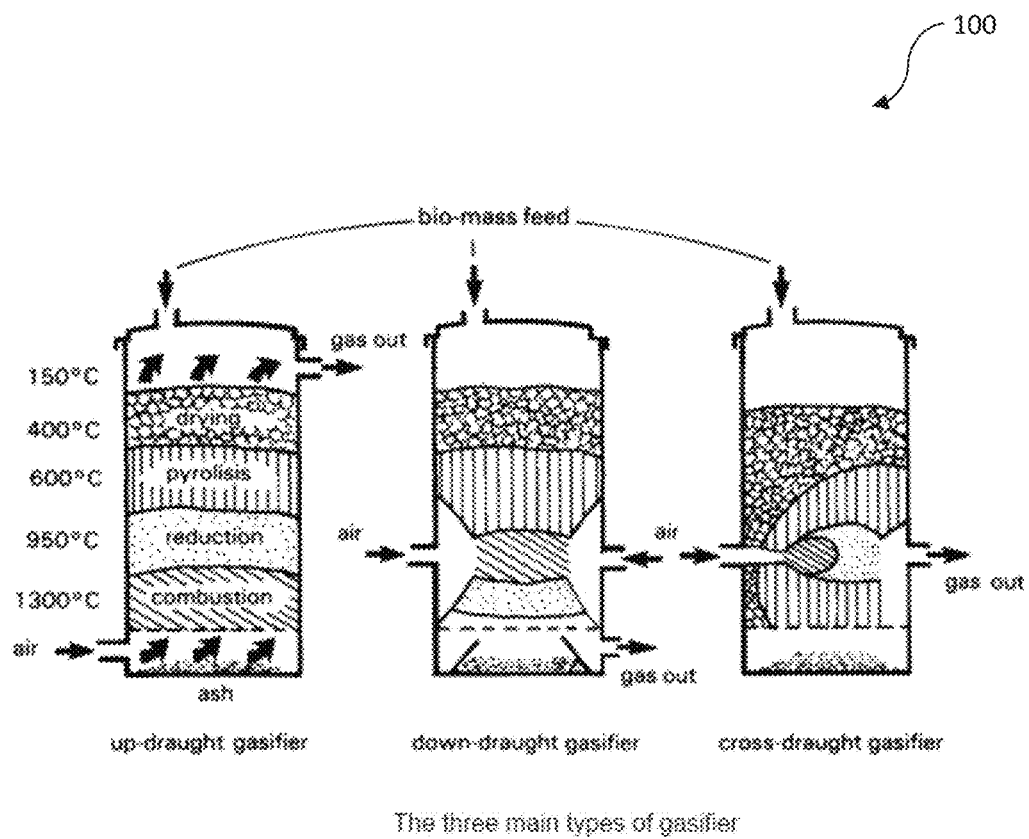
FIG. 1 is a diagram illustrating a prior art fixed bed and moving bed gasifiers or zone processing method.
Figure 2:
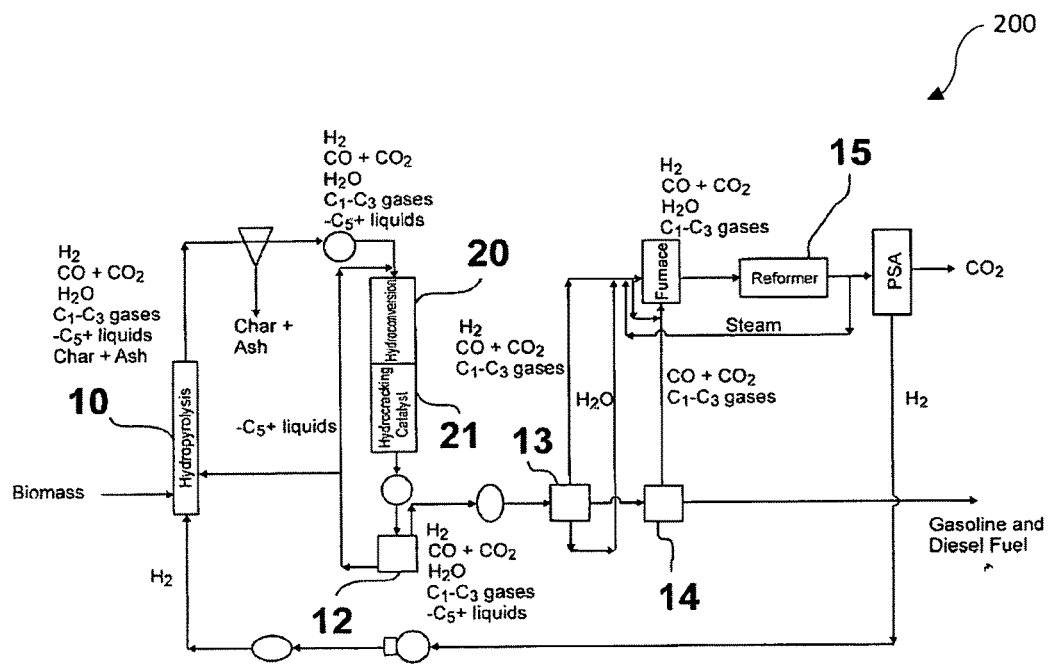
FIG. 2 is a schematic diagram of a prior art from the patented of Gas Technology Institute (GTI) thermochemical system.
Figure 3:
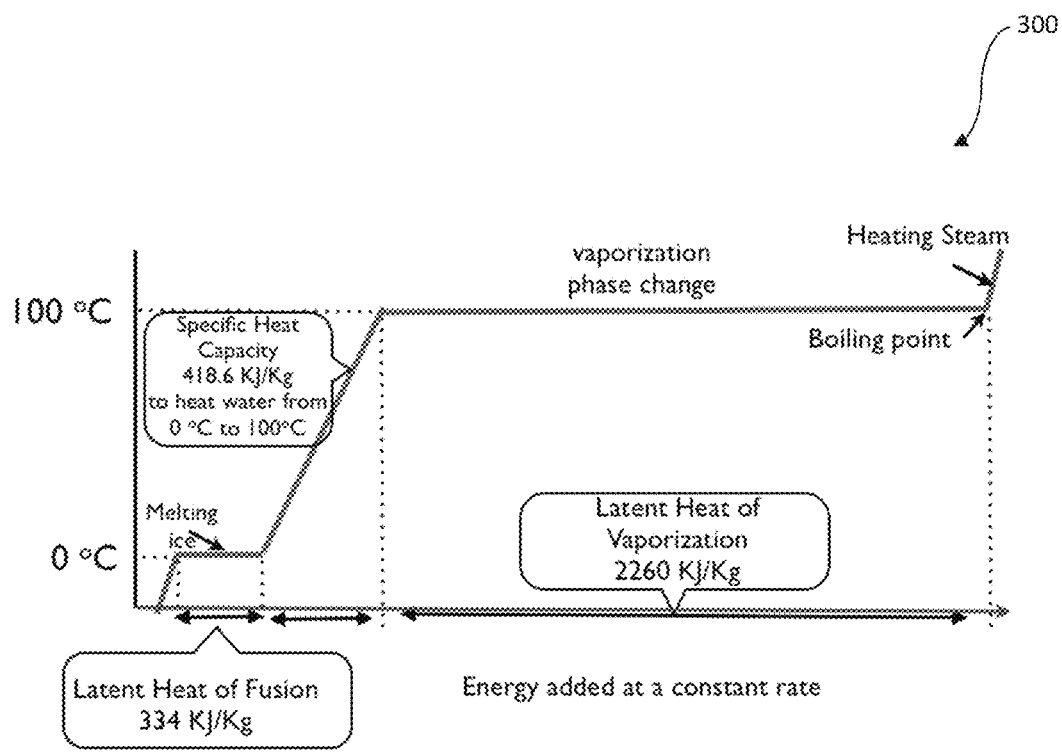
FIG. 3 is a phase and energy diagram of water.
Figure 4:
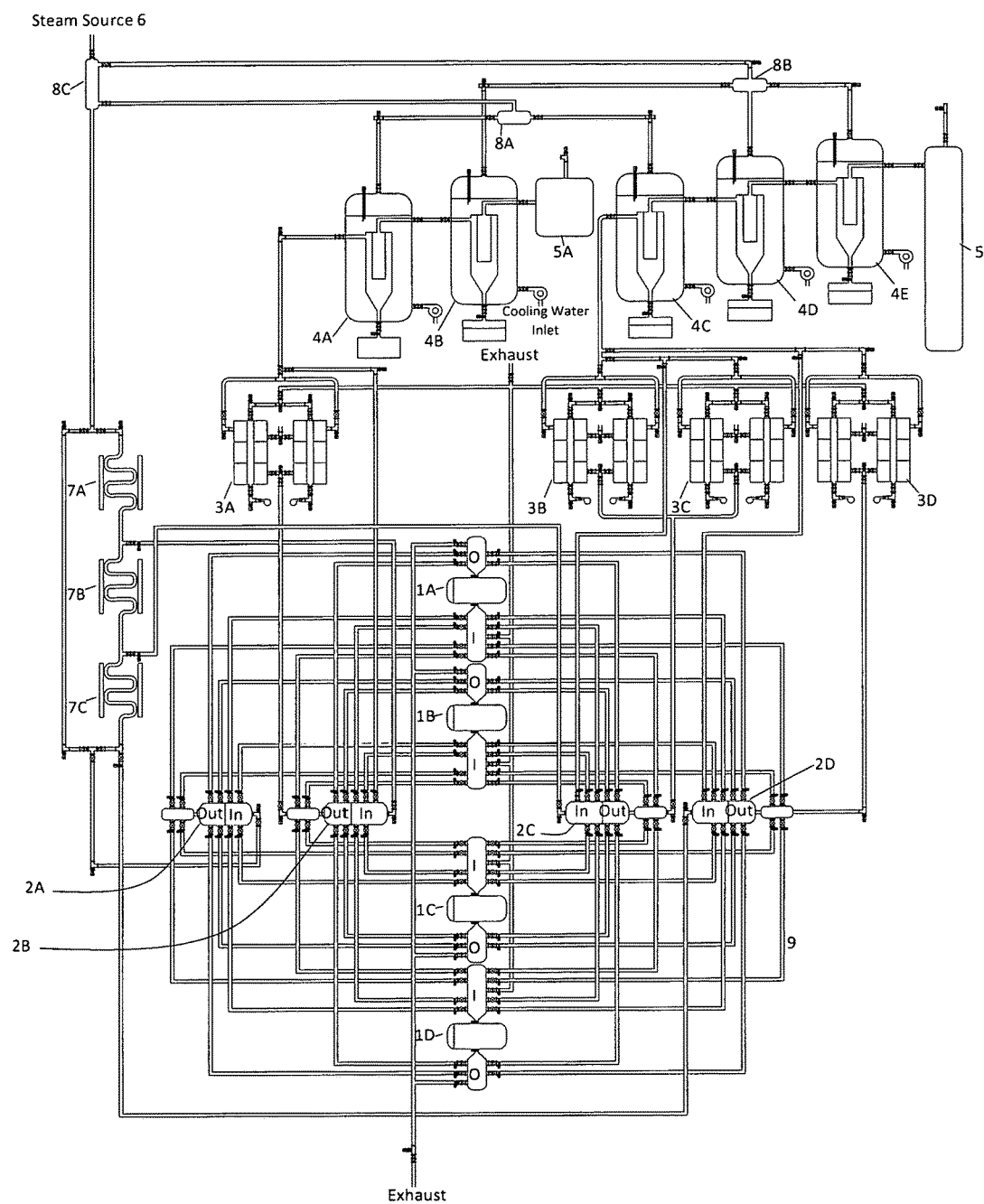
FIG. 4 is a 2D layout diagram of an 1×4 array of reactors in a thermochemical system in accordance with an embodiment of the present invention.
Figure 5:
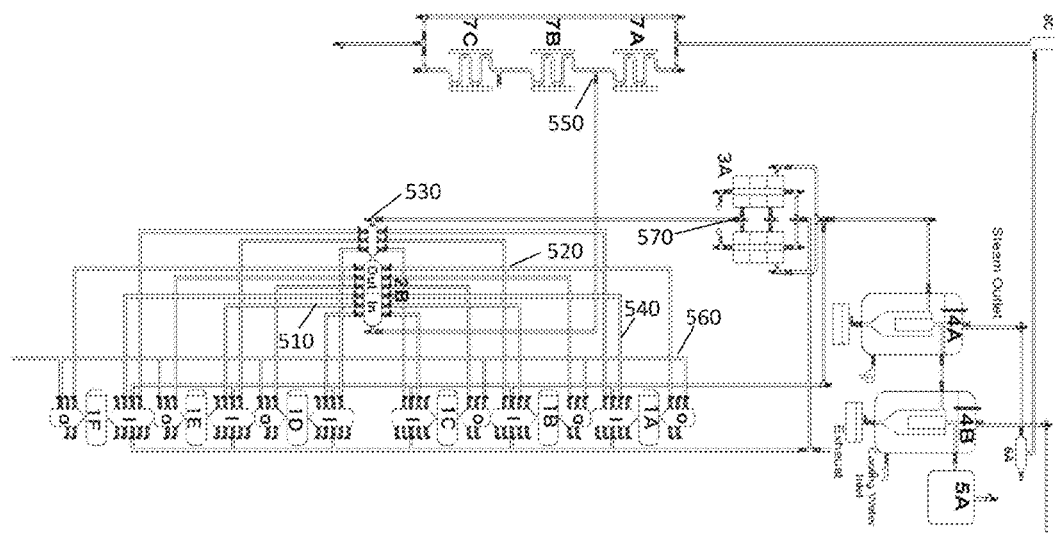
FIG. 5 is a 2D layout diagram of the MUX with associated controlled valves and temperature and pressure sensors in accordance with an embodiment of the present invention.

In FIG. 5, a 2D layout diagram 500 of the Multiplex module (MUX module) 2B with associated controlled valves and temperature and pressure sensors, in accordance with the exemplary embodiment of FIG. 4 is illustrated. In this embodiment, MUX module 2B is designed to provide an inlet section 510 which is separated from an outlet section 520. Outlet section 520 is in fluid communication with distribution section 530. The inlet section 510 of MUX module 2B communicates with all inlets 540 of reactors 1A-1D as well as receives the output 550 from the superheater 7A via the multileveled interconnect pipes and controlled valves network 9. The function of the inlet section 510 of the MUX module 2B is to facilitate the distribution of the input source, i.e. steam source 6, to the inlet 540 of each reactor 1A-1D within the reactor matrix. The outlet section 520 of the MUX module 2B is in fluid communication with the outlets 560 of all reactors within the matrix. The function of the outlet section 520 is to facilitate the communication with the outlets 560 of reactors 1A-1D and distribute the receiving input from one reactor i.e. reactor 1A to the inlets 540 of other reactors i.e. reactor 1B-1D via the distribution section 530 of the MUX module 2B which is in fluid communication with all the inlets 540 of reactors, and/or direct the receiving inputs from the outlets 560 of reactor(s) to the inlet 570 of sub-functional module 3A for further processing. All communicating operations are regulated by the controlled valves in the multilevel connect pipes and controlled valves network. Overall, MUX module 2B facilitates the distribution of processed gases to an inlet of each reactor within the reactor matrix as well as receives the output gas from an outlet of one reactor and distribute the received gas either to the inlets 540 of reactor 1A-1D or direct the received gas to the inlet 570 of sub-functional module 3A. As the results, the MUX module 2B facilitate the multiplexing function for the operation of system 400.

Figure 6:
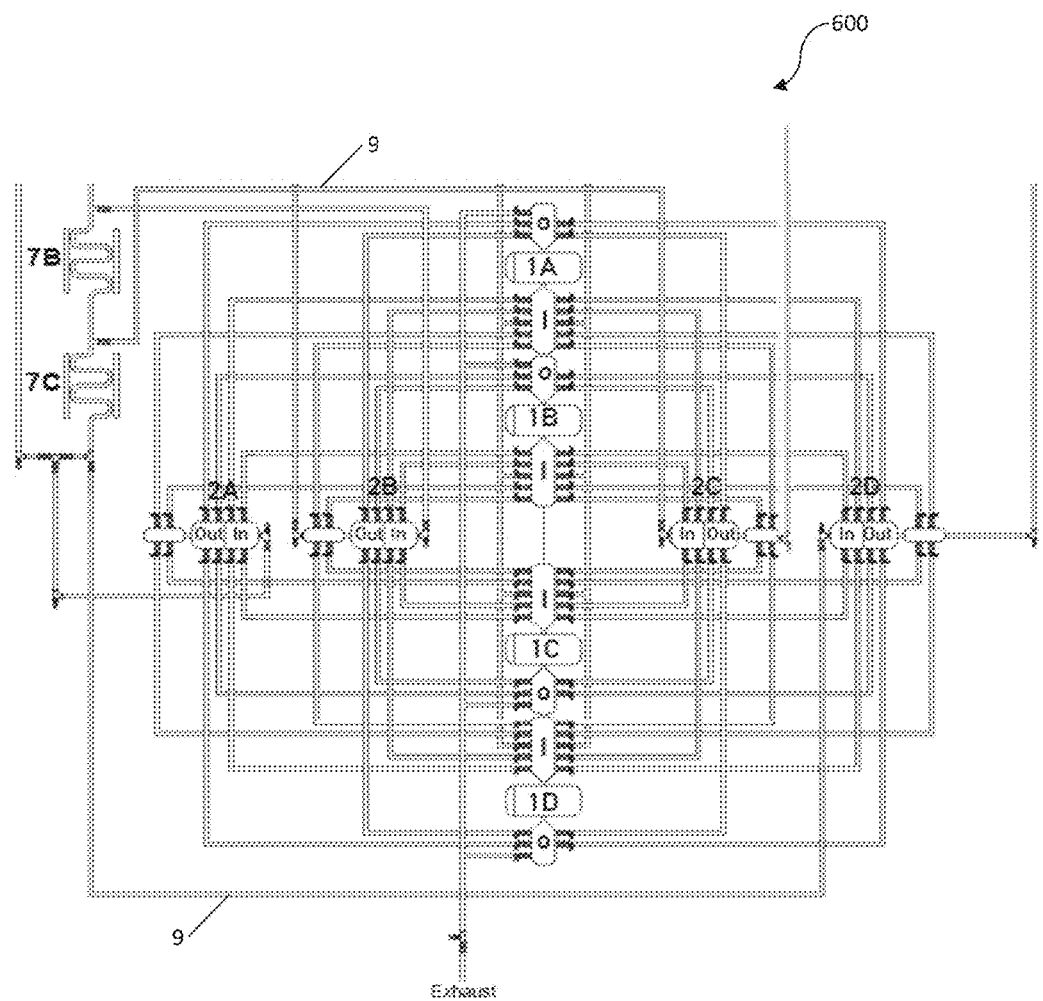
FIG. 6 is a 2D layout diagram of a pipes and controlled valves network of an array of reactors in FIG. 4 in accordance with an embodiment of the present invention.

In FIG. 6, a 2D layout diagram 600 of a pipes and controlled valves network 9 of an array of reactors 1A-1D in FIG. 4 in accordance with an embodiment of the present invention is illustrated.

Figure 7:
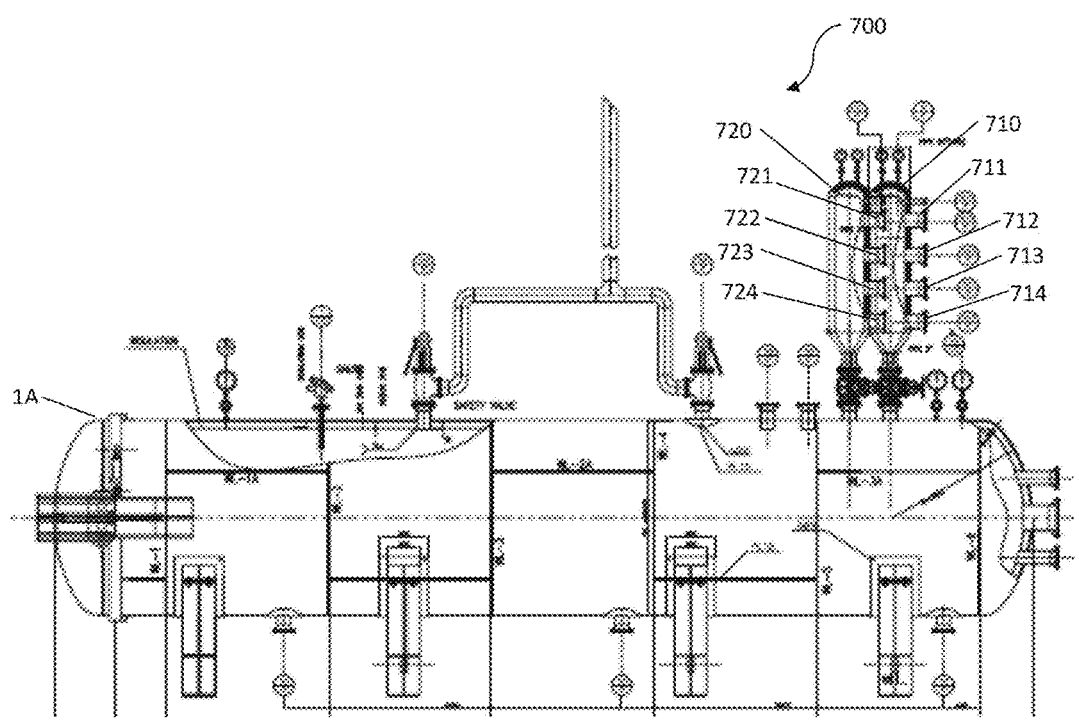
FIG. 7 is a 2D layout diagram of a reactor with inlet and outlet connectors and associated controlled valves and temperature and pressure sensors in accordance with an embodiment of the present invention.

In FIG. 7, a 2D layout diagram 700 of exemplary reactor 1A with inlet tank 710 together with multiple inlet connectors 711-714 to receive the inputs for reactor 701 and outlet tank 720 together with multiple outlet connectors 721-724 to output the process gas from reactor 701.

Figure 8:
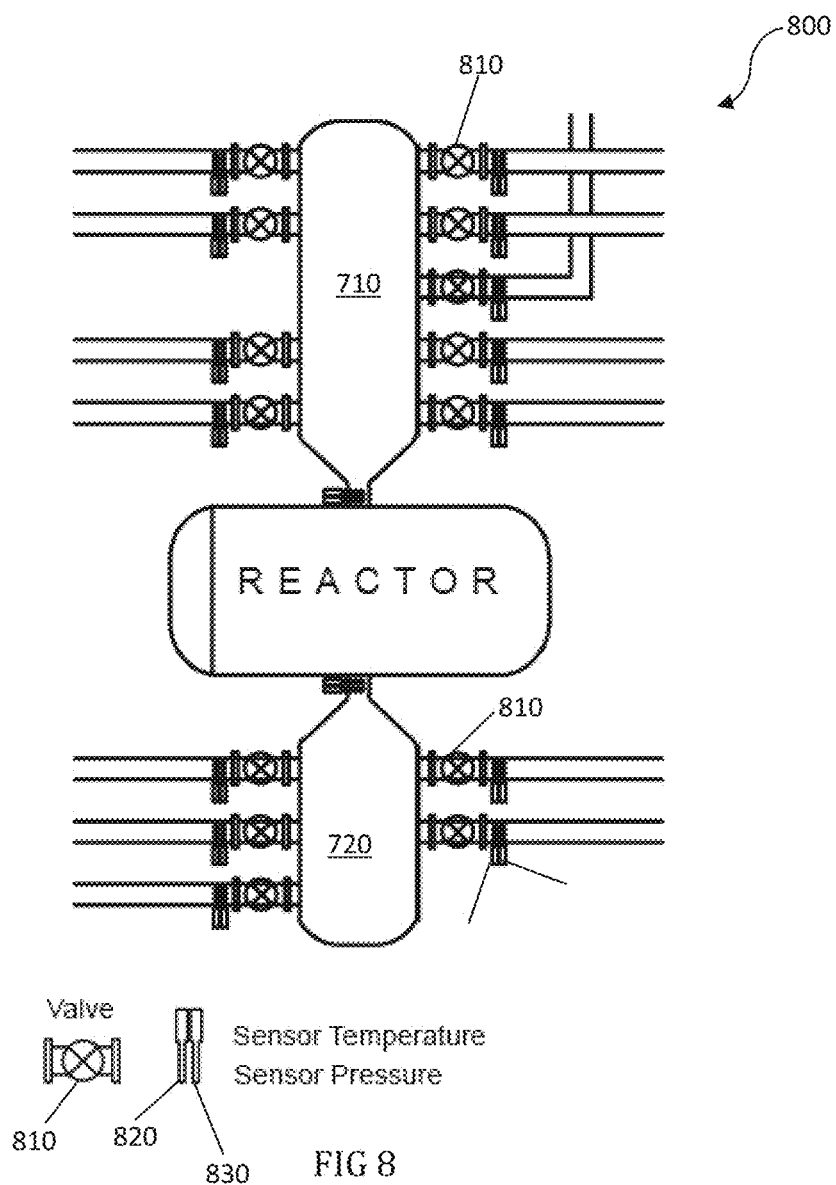
FIG. 8 is a 2D layout of a reactor having inlet and outlet with associated controlled valves and the temperature and pressure sensors in accordance with an embodiment of the present invention.

FIG. 8 illustrate the top view 800 of the reactor 1A-1D as describe in FIG. 4. A temperature sensor 820 and a pressure sensor 830 and associated controlled valves 810 are incorporated in accordance with an embodiment of the present invention.

Figure 9:
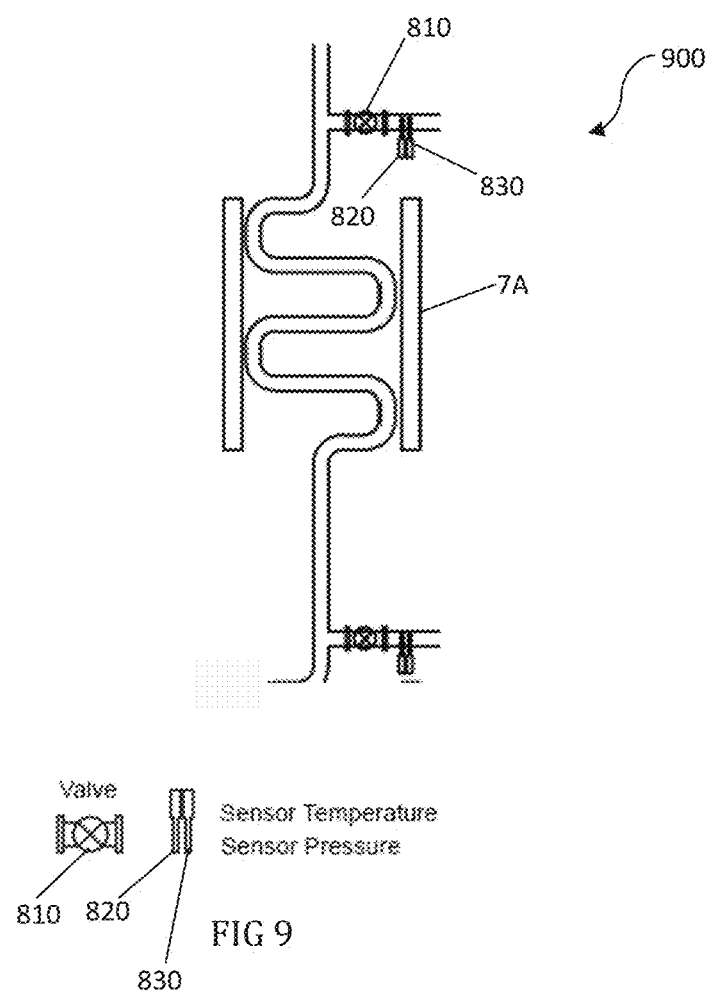
FIG. 9 is a 2D layout of a superheater having inlet and outlet with associated controlled valves and the temperature and pressure sensors in accordance with an embodiment of the present invention.

In FIG. 9, a 2D layout diagram 900 of exemplary superheater 7A is illustrated with associated controlled valves 810, temperature sensor 820, pressure sensor 830, furnace 920 and transporting pipe 9.

Figure 10:
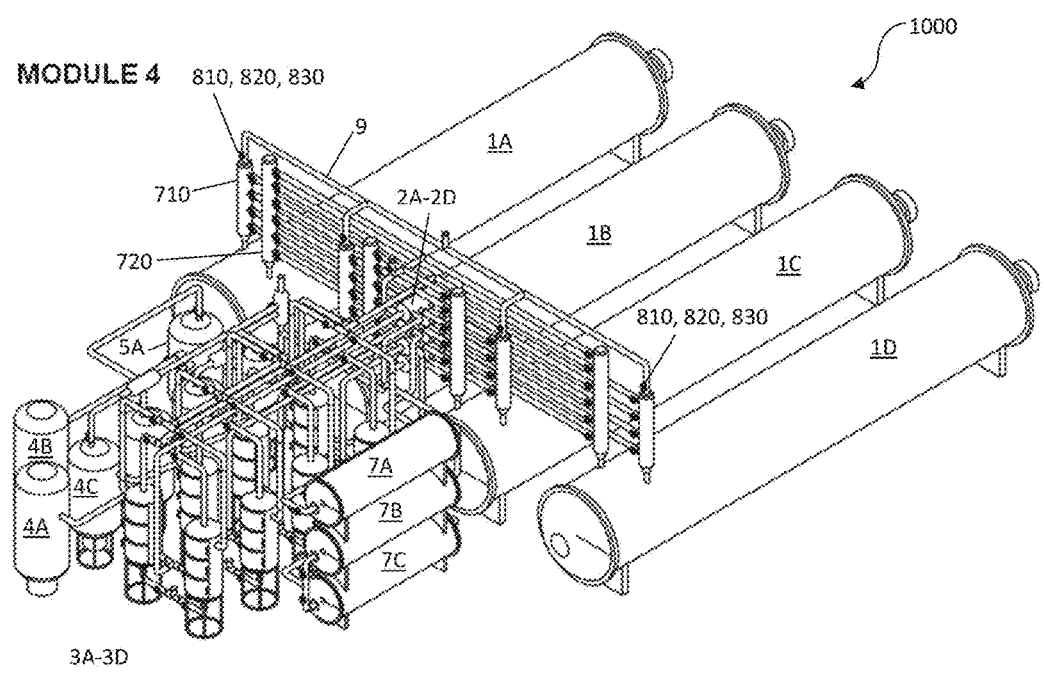
FIG. 10 is 3D diagram of a 1×4 reactor array with sub-functional modules and Condensers and Superheater and gas conditioning/storage/distribution modules in accordance with an embodiment of the present invention.

In FIG. 10, a 3D perspective illustration 1000 of the 1×4 reactor matrix 1A-1D, reactor inlet 710, reactor outlet 720 with associated multilevel-multiplexing interconnect pipes and controlled valves network 9, MUX modules 2A-2D, Sub-functional modules 3A-3D, Condenser modules 4A-4E, Gas conditioning/storage/distribution module 5A-5B, and superheater 7A-7C.

Figure 11:
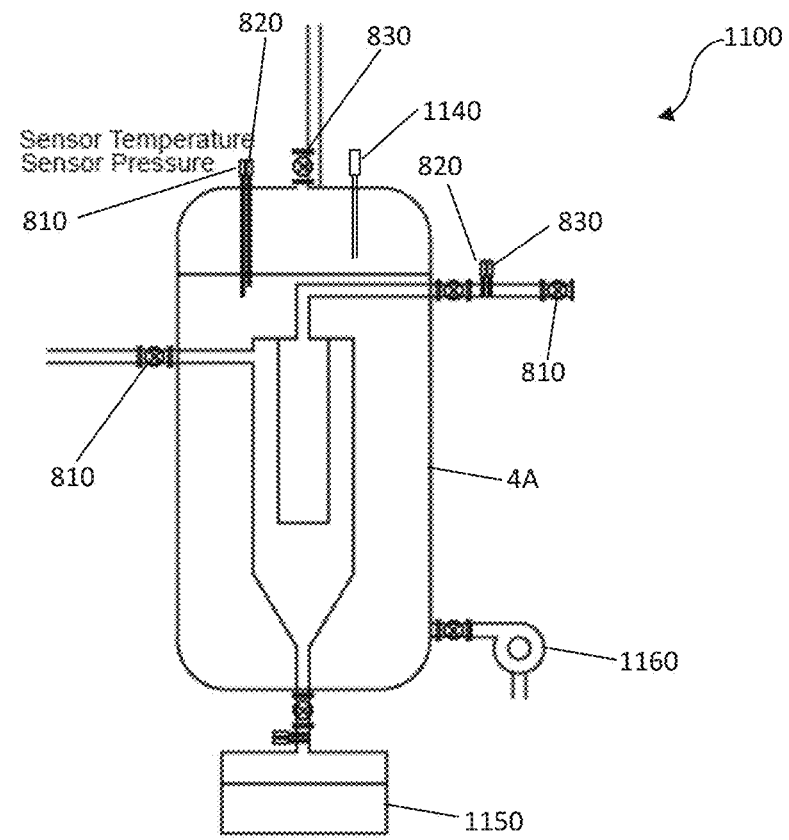
FIG. 11 is a 2D layout of a condenser/heat recovery steam generator having inlet and outlet with associated controlled valves and the temperature and pressure sensors in accordance with an embodiment of the present invention.

In FIG. 11, a 2D layout 1100 of a condenser module with associated controlled valves 810, temperature sensor 820, pressure sensor 830, a water level sensor 1140, a condensate storage tank 1150, and high pressure water pump 1160.

Figure 12:
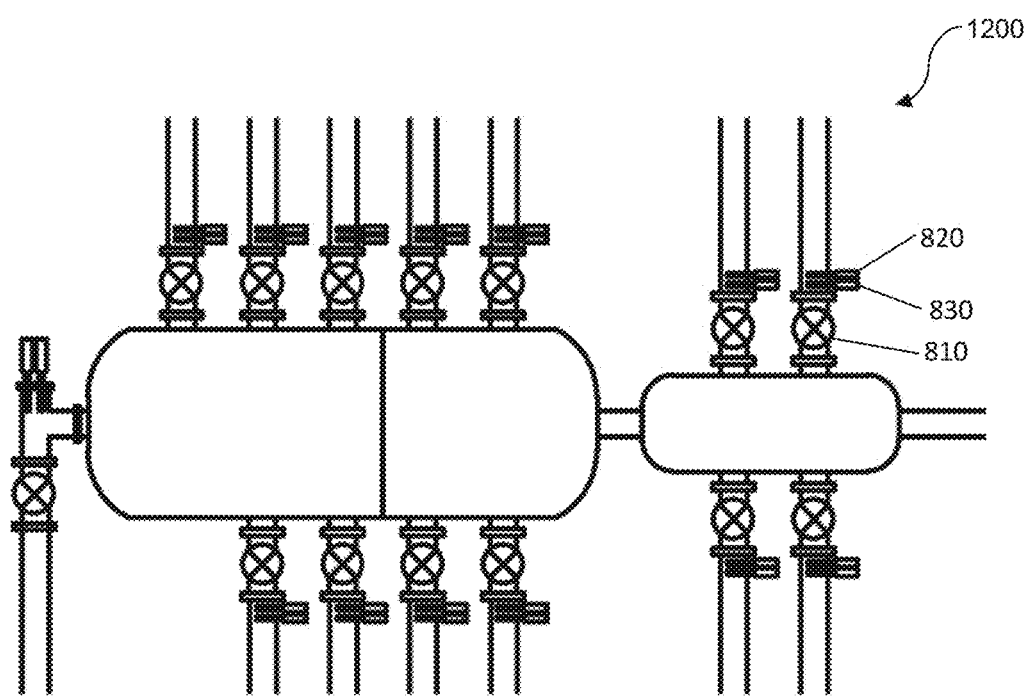
FIG. 12 is a 2D layout of a Multiplexing module having inlet section, outlet section and distribution section with associated controlled valves and the temperature and pressure sensors in accordance with an embodiment of the present invention.

In FIG. 12, a top view 1200 of an exemplary MUX module 2A equipped with controlled valves 810, temperature sensors 820, and pressure 830 is illustrated. In thermochemical system 400 of the present invention, all tubes 9 connected to inlet and outlet are equipped with controlled valves 810, temperature sensors 820, and pressure sensors 830.

Figure 13:
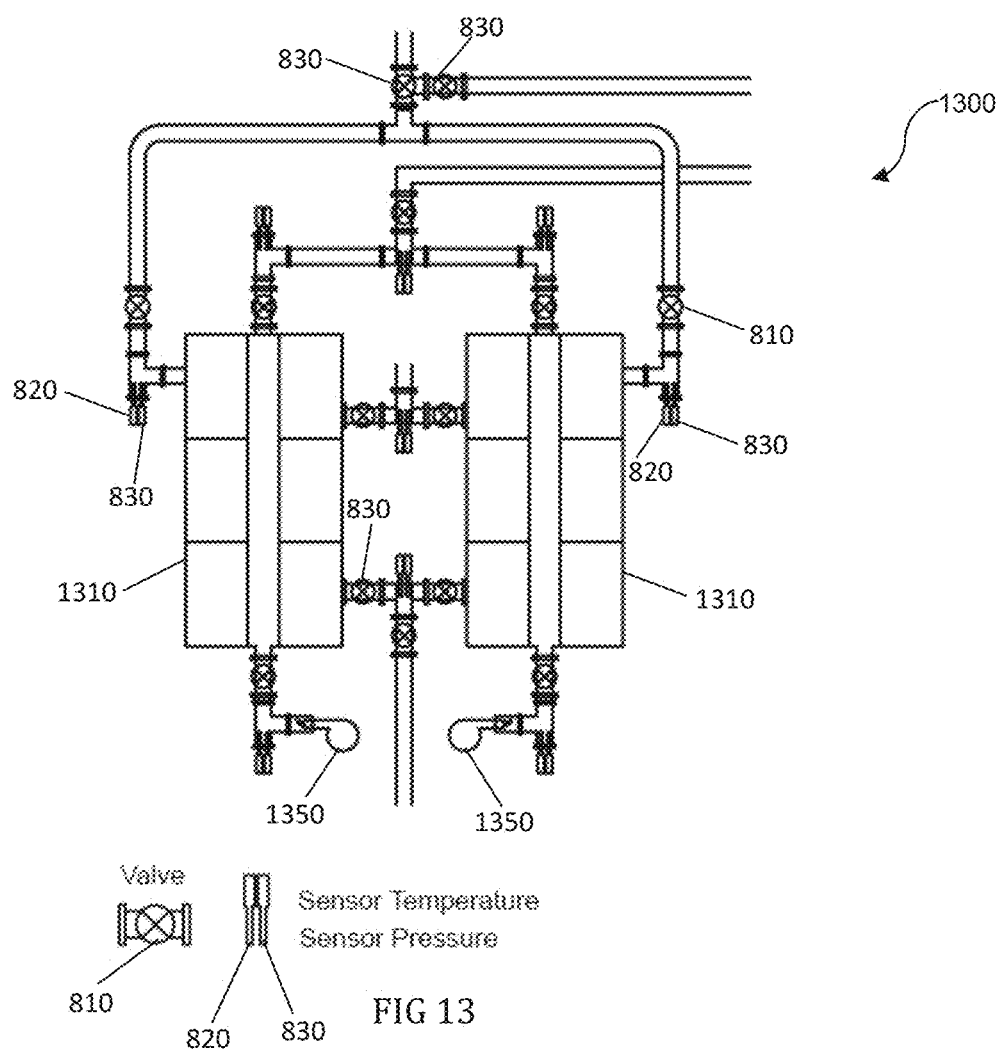
FIG. 13 is a 2D layout of a sub-functional module having inlet and outlet with associated controlled valves and the temperature and pressure sensors in accordance with an embodiment of the present invention.

In FIG. 13, a 2D layout 1300 of sub-functional module designed as dehalogenation module which includes two reactors 1310, each reactor is filled with CaO as catalyst and alternately operates between active and regenerative modes. The input inlet 1320 is directed to the active reactors 1A-1D via controlled valves 830. A burner 1350 supplies the heat energy required for the regeneration mode.

Figure 14:
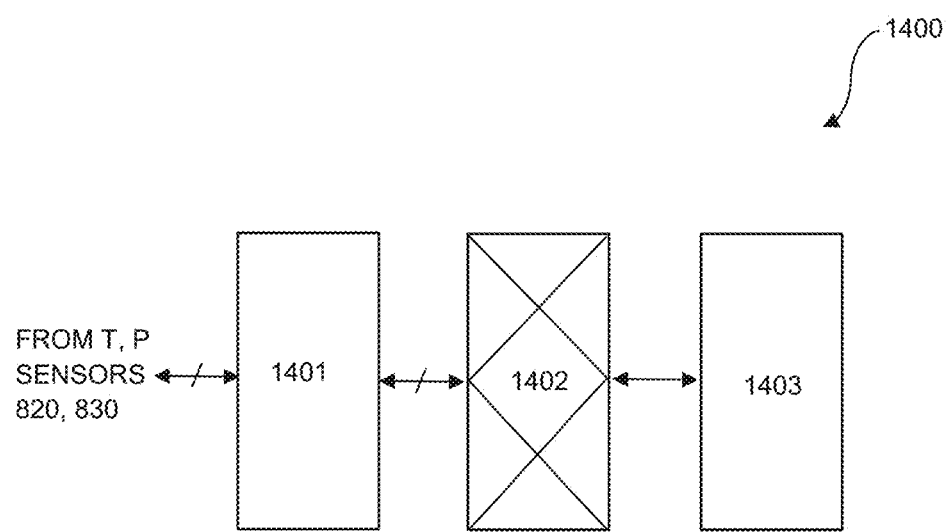
FIG. 14 is a schematic diagram of a micro controller with transceiver and A-D/D-A converter for monitoring and controlling the operation of the thermochemical system described in FIG. 4 in accordance with an embodiment of the present invention.

Now referring to FIG. 14, a schematic diagram 1400 of a microcontroller 1403 with a transceiver 1401 and a A-D/D-A converter 1402 for monitoring and controlling the operation of the thermochemical system 400 as described in FIG. 4 is illustrated. In one embodiment, transceiver 1401 receives signals from temperature sensors 820 and pressure sensors 830. A-D/D-A converter 1402 converts the received temperature and pressure signals into digital signals. Microcontroller 1403 processes the digital signals and decides the operation of thermochemical system 400 by varying temperature $T_1$, pressure $P_1$, process agent, $PA_1$, and process flow $PF_1$. These commands from microcontroller 1403 is converted to analog signals and sent to interconnecting pipes and valves network 9 via transceiver 1401. In one embodiment, the detailed operation of thermochemical system 400 described below can be fully monitored and controlled by microcontroller 1403, A-D/D-A converter 1402, and transceiver 1401. Furthermore, the operations of thermochemical system 400 of the present invention are evidenced by FIG. 15 to FIG. 20. The operations 1500-2000 can be monitored and controlled by a software program installed in microcontroller 1403.

Now referring to FIG. 4 again, the function and operation of each component of system 400 described above are discussed herein. Steam boiler 6 is designed to provide to system 400 both the processing agent i.e. steam and the pressure source from the built-up pressure inside steam boiler 6.

After the loading of feedstocks into reactor 1A, 1B, 1C and 1D, the drying process will starts, for example, with reactors 1A. Initially, as the steam from steam source 6 is distributed inside the chamber of reactor 1A via MUX module 2A and multilevel-multiplexing interconnect pipes and controlled valves network 9, the steam will condense and release the latent heat energy inside the chamber of reactor 1A, thus supplying the additional heat energy in addition to the sensible heat transfer between the steam and materials inside the reactor 1A. In effect, the heat energy spent by steam boiler 6 to generate the amount of condensed steam in reactor 1A is effectively transferred and recovered inside the chamber of reactor 1A. The condensed water inside the chamber is removed via the exit drainage of reactor 1A. The steam source from steam boiler 6 continues to transfer both the latent and sensible heat energy to the chamber of reactor 1A, thus quickly heating up and increasing the pressure of the chamber of reactor 1A. The temperature and pressure of the chamber of reactor 1A continue to increase up to the temperature and pressure of steam boiler 6. As the material inside the chamber of reactor 1A is heated up under the pressure, the moisture content of feedstocks can be evaporated when the pressure inside the chamber is reduced. In a similar operation as above, the vaporized moisture from the feedstocks in reactor 1A can be transferred to other reactors within the network via multileveled interconnect pipes and valves network 9, for example to reactor 1B, to start the drying process for this reactor. Since the chamber of reactor 1B is initially at ambient temperature and atmospheric pressure, the evaporated moisture from reactor 1A will condense and release the latent heat energy in addition to the sensible heat transfer between the evaporated moisture and the feedstocks inside reactor 1B. Thus, the energy content of the evaporated moisture from reactor 1A is transferred and recovered in reactor 1B to contribute the heat energy for the drying process of reactor 1B. The balance of the required heat energy for the drying process of reactor 1B is supplied by steam boiler 6. In essence, the concept of this invention in utilizing multiple reactors and combining with multileveled interconnect pipes and controlled valves network 9 is to facilitate the energy transfer between reactors 1A-1D. As a result, system 400 of the present invention substantially reduces the energy cost of the drying operation of all reactors. This reduction of energy cost of the drying operation also enables the treatment of much higher moisture content feedstocks in thermochemical processes which generally require the moisture content of the feedstocks to be less than about 30% or even less than about 15% in order to achieve the desired operation. Furthermore, the capability of drying the whole volume of the reactor via the built in steam distribution sub-system inside reactor 1A enables the volumetric drying operation instead of zone-drying operation as in the case of conventional fixed bed gasification. This capability will shorten the drying time and can be conveniently adapted to both smaller distributed scale and larger industrial scale for the thermochemical processing of carbonaceous feedstocks.

Referring back to reactor 1A, after the evaporated moisture was transferred to reactor 1B, the low temperature pyrolysis of reactor 1A can immediately starts as part of the steam flow from steam boiler 6 is superheated via superheater 7A to continue increasing the temperature of reactor 1A. The output temperature of superheater 7A can be regulated via internal resistive and/or hot gas heating and/or other suitable means which is built in with superheater 7A. The target temperature for the low temperature pyrolysis is in the range between about 250° C. to about 380° C. The duration at the target temperature for reactor 1A can be decided in-process in according to the properties of the feedstock and/or the desired output. During the low temperature pyrolysis stage of reactor 1A, some of components of the feedstocks are devolatilized into vapor. In particular, a majority of hemicellulose component of carbonaceous materials decomposes at this stage and/or a majority of Chlorine component of PVC will volatilize and react with hydrogen component in the environment inside reactor 1A to form HCl (hydrochloric acid) in the temperature range of about 250° C. to about 380° C. The vapor exits from the outlet of reactor 1A is directed to sub-functional reactor 3A which is the dehalogenator/hot filter with CaO as active element, via MUX module 2B in multilevel-multiplexing interconnect pipes and controlled valves network 9. In sub-functional reactor 3A, those compounds such as HCl, $H_2S$ and $CO_2$ will be converted and isolated according to the reactions:

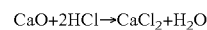
$CaO+2HCl \rightarrow CaCl_2+H_2O$

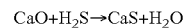
$CaO+H_2S \rightarrow CaS+H_2O$

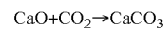
$CaO+CO_2 \rightarrow CaCO_3$

The output from sub-functional reactor 3A is then directed to condensers 4A and 4B which are connected in series to affect the fractionated condensing for the condensable vapor, and the output from the condenser 4B is directed to gas conditioning/storage/distribution module 5A to process the non-condensable gas and facilitate the storage/distribution operation of the combustible gas to supply the heat energy for system 400. In this exemplary embodiment, condenser module 4A and 48 are also designed as a heat recovery steam generator to facilitate both the fractionated condensing and the recovery of the sensible heat energy from the high temperature processing gases to generate additional steam for the operation of system 400. The heat recovery steam generator function of condensers 4A-4D helps reducing the energy cost by providing the additional steam for system 400 via the distribution tanks 8A and 8C.

In this stage of operation of this embodiment, the Chlorine and Sulphur elements from the feedstocks can be captured and isolated from the process vapor thus eliminating the possibility of forming toxic organic pollutant such as Dioxin and Furan as system 400 progresses to later stages. In addition, the elimination of Sulphur element from the feedstocks at the early stage of the process help reducing the possibility of catalyst poisoning in subsequent process stages and making the downstream processing of the vapor simpler and less costly. Furthermore, the decomposition of hemicellulose in the temperature range generates a substantial amount of carboxylic compound such as acid acetic, thus by extracting the acid acetic at this low temperature pyrolysis stage, the liquid produced in the subsequent high temperature pyrolysis stage will be less acidic. Similar to the case of operation in the drying stage, the capability of volumetric processing at this stage of the reactor 1A can also be achieved, and the duration of this low temperature pyrolysis stage can be decided in-process simply via the switching of controlled valves.

After the duration of the low temperature pyrolysis stage of reactor 1A, the high temperature pyrolysis operation can immediately start by simply diverting a portion of steam boiler 6 through superheater 7A and 7B. The output temperature at the exit of superheater 7B can be regulated by internal resistive and/or hot gas heating and/or other suitable means which is built in with the superheater 7A and 7B. The target temperature for the high temperature pyrolysis is in the range of about 450° C. to about 600° C. The duration at the target temperature for reactor 1A can be decided in-process according to the properties of the feedstock and/or the desired output. During the high temperature pyrolysis stage of reactor 1A, the remaining components of the feedstocks will be devolatilized into vapor. The vapor exits from the outlet of reactor 1A is directed to the sub-functional reactor 3B which is the catalytic cracking reactor with HZSM-5 as catalyst and CaO or dolomite as guard bed and/or sub-functional reactor 3C which is a hydrotreating reactor with CoMo/$\gamma$-$Al_2O_3$ as catalyst, via MUX module 2C in multileveled interconnect pipes and controlled valves network 9. The output from sub-functional reactors 3B and 3C is directed to condenser 4C, 4D and 4E which are connected in series to affect the fractionated condensing for the condensable vapor. The output from condenser 4E is then directed to gas conditioning/storage/distribution module 5 to process the non-condensable gas and facilitate the storage/distribute operation of the combustible gas to supply the heat energy for the operation of the system 400. In this exemplary embodiment, the condenser module 4C, 4D, and 4E are also designed as a heat recovery steam generator to facilitate both the fractionated condensing and the steam generation simultaneously. The heat recovery steam generator function of condensers 4A-4D also help reducing the energy cost by providing the additional steam for system 400 via distribution tanks 8B and 8C.

After the high temperature pyrolysis stage in reactor 1A is completed, the remaining carbon residue in reactor 1A can be cooled and removed from the reactor 1A to be used as an energy source, soil improvement in agricultural applications, Carbon sequestration and/or combinations thereof.

During the cooling process, the sensible heat energy of the carbon residue which is at about 500° C. to about 600° C. in reactor 1A can also be recovered and immediately utilized to supply additional steam and/or heat energy for the operation of the system 400 via MUX modules 2A and 2B respectively. In this exemplary embodiment of this invention, the energy recovery from the hot carbon residue in reactor 1A is achieved by directing a portion of the steam from steam boiler 6 which is at about 158° C. under about 5 bar pressure to the inlet of reactor 1A via MUX module 2A of multileveled interconnect pipes and controlled valves network 9 to extract the heat energy from while effectively cool off the carbon residue. Optionally, a controlled amount of pressurized mist of water can be injected together with the steam to speed up the cooling process while generating additional steam for the operation of system 400. The higher temperature steam exits from the outlet of reactor 1A can be used immediately to provide the steam for the drying stage via MUX module 2A and/or the heat energy for the low temperature pyrolysis stage via MUX module 2B, to other reactors within system 400 via multileveled interconnect pipes and controlled valves network 9. The carbon residue can be removed from reactor 1A after the temperature is reduced to about 60° C. or below. Consequently, the overall energy requirement for the operation of system 400 is effectively reduced from this energy recovery.

As an example of the flexibility in operation of the invented concept, reactor 1A with the remaining hot carbon residue inside, instead of cooling off and removing the hot carbon residue, can immediately start the gasification stage by simply diverting a portion of steam boiler 6 through superheater 7A, 7B and 7C. The output temperature at the exit of superheater 7C can be regulated by internal resistive and/or hot gas heating and/or other suitable means which is built in with superheater 7A, 7B and 7C. The output from superheater 7C is directed to the inlet of reactor 1A via MUX module 2D of multilevel-multiplexing interconnect pipes and controlled valves network 9. The target temperature for the gasification stage is in the range of about 700° C. to about 900° C. Optionally, a controlled amount of pressurized air and/or oxygen can be injected together with the superheated steam at the inlet of reactor 1A to achieve the autothermal gasification process in reactor 1A by the partial oxidation of the hot carbon residue. Similar to the cases of pyrolysis stages, the volumetric gasification operation is also achieved via the steam distribution system built in with reactor 1A. The vapor or syngas exits from the outlet of reactor 1A is directed to sub-functional reactor 3D which is a water gas shift reactor with the iron oxide-chromium oxide catalyst, via MUX module 2D of multileveled interconnect pipes and controlled valves network 9. In sub-functional reactor 3D, the vapor or syngas reacts with the catalyst according to the follow reaction:

$CO+H_2O \leftrightarrow CO_2+H_2$. The hydrogen enriched syngas exits from sub-functional 3D is directed to condensers 4C, 4D and 4E which are connected in series to affect the fractionated condensing for the residual condensable vapor of the produced syngas. The output from condenser 4E is directed to gas conditioning/storage/distribution module 5 to process the non-condensable gas and facilitate the storage/distribute operation of the combustible gas to supply the heat energy for the operation of system 400. In this exemplary embodiment, condenser modules 4C, 4D, and 4E are also designed as a heat recovery steam generator to facilitate both the fractionated condensing and the steam generation simultaneously. The heat recovery steam generator function of the condensers also help reducing the energy cost by providing the additional steam for system 400 via distribution tanks 8B and 8C.

Returning to reactor 1B, after receiving the energy transfer from the evaporated moisture of reactor 1A, the subsequent operation of reactor 1B is proceeded in a similar operation as described above for reactor 1A, including the energy transfer and process gases transfer to other reactors in system 400. Other reactors within the system 400 will also be operated in a similar fashion as with reactor 1A and 1B. This "master and slave" operation can be extended to a larger number of reactors within the reactor matrix to affect the increase of production capacity in an add-on manner without a major reconstruction of the whole existing thermochemical processing plant.

Furthermore, this invented concept can be implemented in a modular approach which includes grouping a large number of reactors into multiple smaller, easier to manage modules, i.e., 1A-1D. Each module 1A-1D can be configured in an analogous configuration as in the exemplary embodiment of FIG. 4. The communication between individual modules and reactors within the matrix can be facilitated by the multiplexing operation of processed gases transfer via MUX modules 2A-2D associate with the multileveled interconnect pipes and controlled valves network 9. Thus, the modular approach of the invented concept can accommodate both smaller, distributed scale and the larger, industrial scale with respect to the production capacity. Since any individual reactor and/or a group of reactors 1A-1D and/or individual module and/or a group of modules 400 can be taken off-line for service while the remaining reactors/modules can still be in operation, this invented concept provides the capability to scale up production capacity, even to large industrial scale operations, without the higher severity in operation commonly accompanying the capacity scale up for thermochemical processing systems. As the result, the up-time for the modular systems will inherently be higher.

Figure 15:
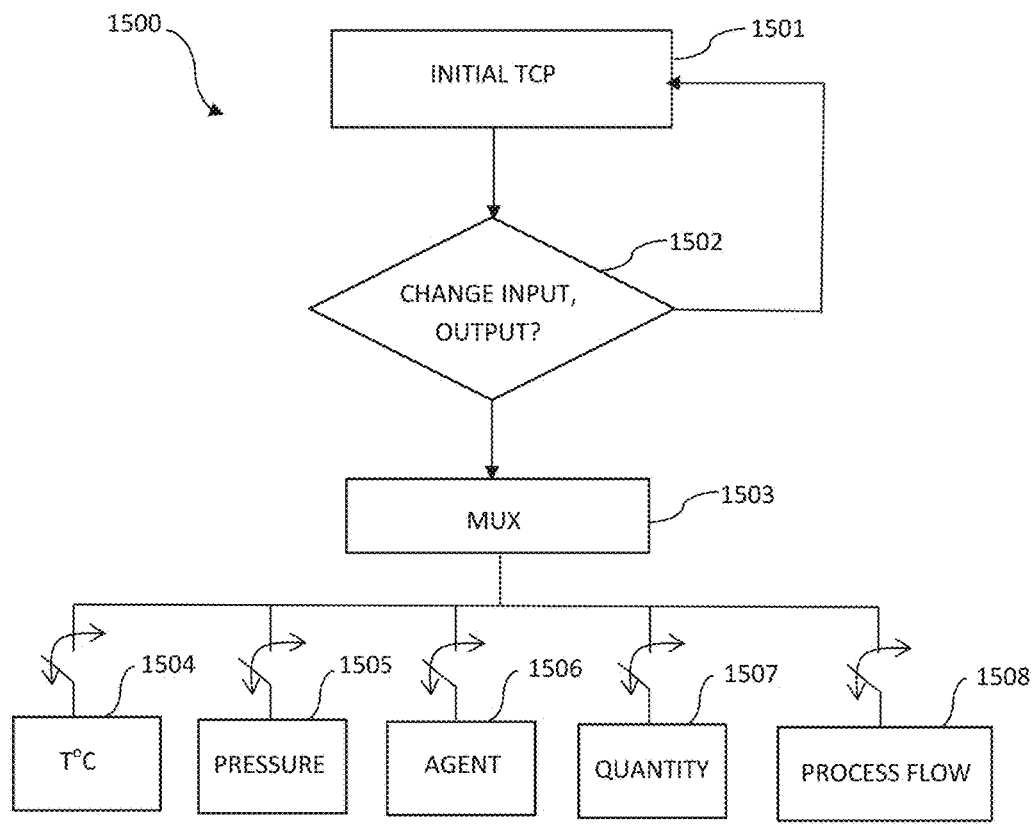
FIG. 15 is a flow chart describing the volumetric and in-process dynamic capabilities of the thermochemical system of FIG. 4 in accordance with an embodiment of the present invention.

Now referring to FIG. 15, a flowchart 1500 describing the volumetric and in-process dynamic capabilities of thermochemical system 400 in accordance with an embodiment of the present invention is illustrated. As described in FIG. 4, the unique architecture allows dynamic changes in temperature, pressure, processing agents, relative ratios of end products and process flow at any instance during the operation of thermochemical system 400.

At step 1501, a thermochemical system is constructed that includes a group of reactors, a group of multiplexing (MUX) modules with associated controlled valves functioning as switches, a group of sub-functional module/reactors, a group of condensers/heat recovery steam generators (C-HRSG) and steam distribution tanks,
a group of gas processing/storage/distribution modules, a processing agent and pressure source (steam boiler), a group of superheaters, and all the above components are interconnected and communicated via a multilevel interconnect pipes and controlled valves network.

At step 1502, an input and/or output are changed due to requirement changes? For example, in one situation feedstocks input into each reactor can be changed. In another situation, the outputs need to change to different output product ratios among bio-oil, gas, carbon, etc. In one embodiment, both input and output can be changed simultaneously.

At step 1503, if the input/output are changed, MUX modules and multi-level interconnect pipes and controlled valves network are switched to change the operating parameters in accordance to the present invention.

At step 1504, multi-level interconnect pipes and controlled valves network and MUX modules are used to change the temperature parameter of the system.

At step 1505, multi-level interconnect pipes and controlled valves network and MUX modules are used to change the pressure parameter of the system.

At step 1506, multi-leveled interconnect pipes and controlled valves network and MUX module are utilized to affect the change of the process agent parameter of the system.

At step 1507, a first thermochemical system is connected to a second thermochemical system using a multi-level interconnect pipes and controlled valves network and MUX modules to affect the change of the processing quantity. The first thermochemical system having 4 reactors can be connected to a second thermochemical system having 6 reactors to increase the quantity of the input feedstocks.

Finally, at step 1508, multi-level interconnect pipes and controlled valves network and MUX modules are used to change the process flow parameter of the system.

Figure 16:
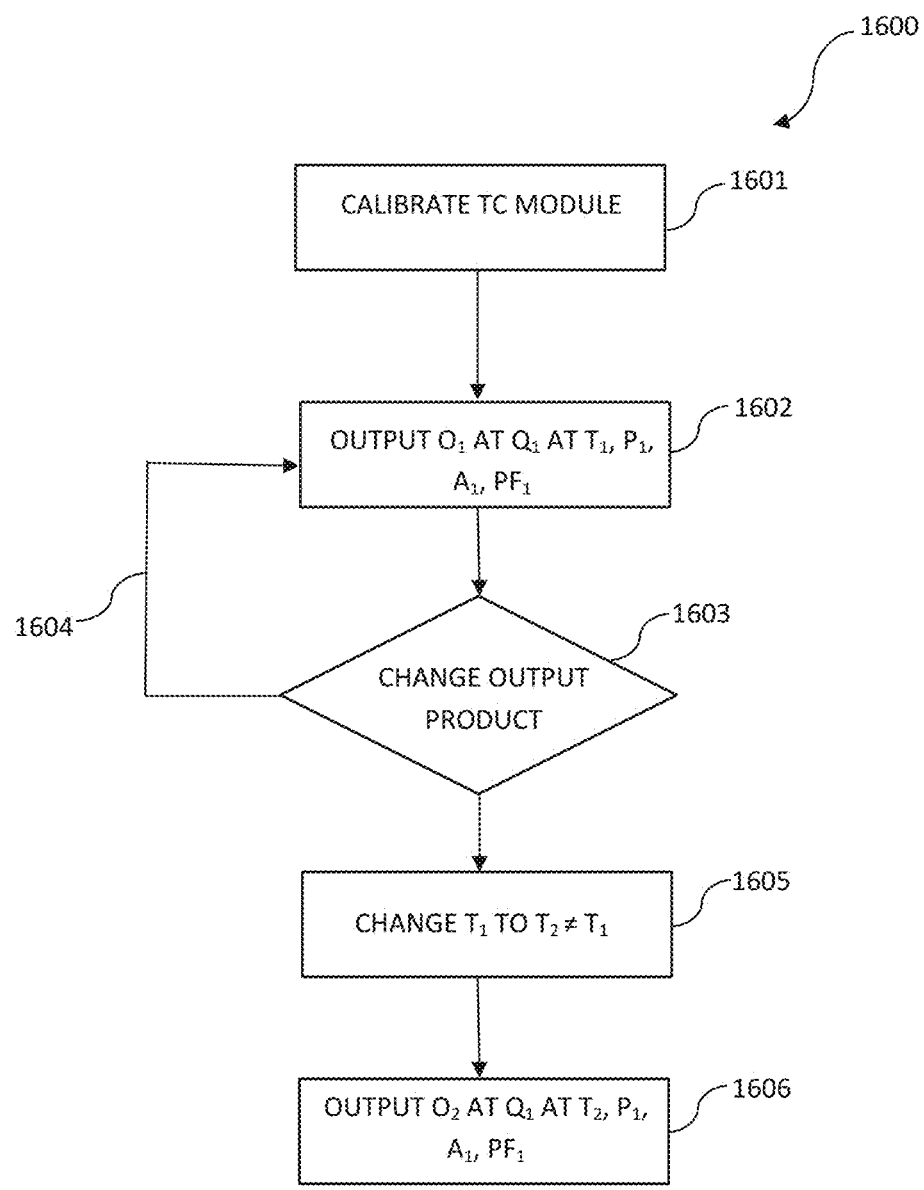
FIG. 16 is a flowchart describing the process of dynamically changing the output by varying the temperature parameter of the thermochemical system of FIG. 4 in accordance with an embodiment of the present invention.

Next referring to FIG. 16, a flow chart describing a process 1600 of dynamically changing the output by changing the temperature parameter of a thermochemical system in accordance to an embodiment of the present invention is illustrated.

At step 1601, a dynamic thermochemical system is constructed as described in FIG. 4-FIG. 6 and related description above. In one embodiment, dynamic thermochemical system 400 has five different operating parameters. They are quantity, temperature, pressure, process agent, and process flow. In a preferred embodiment, dynamic thermochemical system 400 is calibrated before use for safety and efficiency reasons. More specifically, hot steam is released from steam boiler 6 into each interconnecting pipes and valves network 6. Pressure sensors 830 are checked by controller for possible tar buildup within any pipes. If the measured pressures at any pipes are dropped, the controller sends an alarming signal for checkup and/or replacement of those particular plug-up pipes. After calibration, thermochemical process as described in FIG. 4 can begin.

At step 1602, an output $O_1$ is produced at a first quantity $Q_1$, temperature $T_1$, pressure $P_1$, process agent, $PA_1$, and process flow $PF_1$.

At step 1603, determined if there is a need to change the output. If the answer is no, process 1600 continues with the same output $O_1$ at step 1604. As discussed above, the output of dynamic thermochemical system 400 include syngas, bio-oil, and carbon residues. At step 1605, the operating temperature is changed if the output is changed. In one embodiment, the temperature can be changed by opening appropriate interconnecting pipes and valves network 9 so that superheaters 7A-7C and/or by latent heat transferred from previous reactor 1A increase the temperature in the chamber of the present reactor, 1B.

At step 1606, after the operating temperature is changed, a different output $O_2$ is produced. More specifically, when temperature is increase, dynamic thermochemical system 400 produces a higher amount of syngas, lower amount of bio-oil, and lower amount of carbon residues than the initial operating condition specified above.

Figure 17:
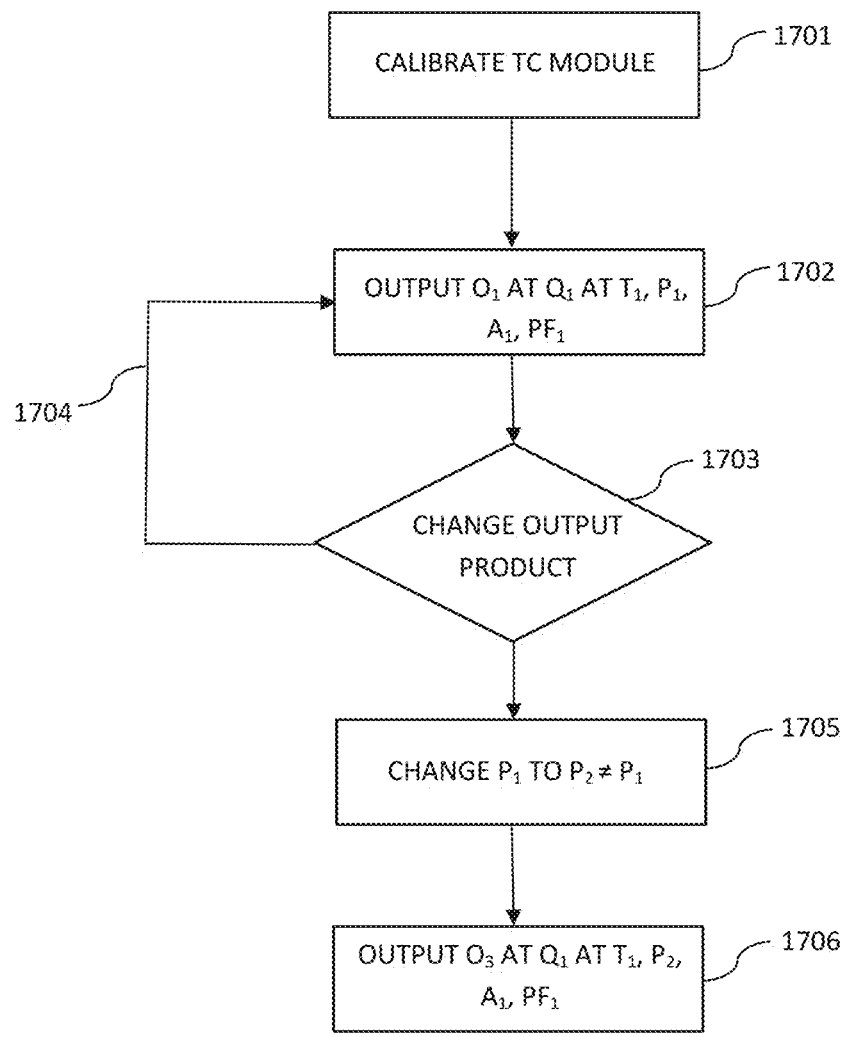
FIG. 17 is a flow chart describing a process of dynamically changing the output by varying the pressure parameter of a thermochemical system of FIG. 4 in accordance with an embodiment of the present invention.

Next referring to FIG. 17, a flow chart describing a process 1700 of dynamically changing the output by changing the pressure parameter of a thermochemical system in accordance to an embodiment of the present invention is illustrated.

At step 1701, a dynamic thermochemical system is constructed as described in FIG. 4-FIG. 6 and related description above. In one embodiment, dynamic thermochemical system 400 have five different operating parameters. They are quantity, temperature, pressure, process agent, and process flow. In a preferred embodiment, dynamic thermochemical system 400 is calibrated before use for safety and efficiency reasons. More specifically, hot steam is released from steam boiler 6 into each interconnecting pipes and valves network 6. Pressure sensors 830 are checked by controller for possible tar buildup within any pipes. If the measured pressures at any pipes are dropped, the controller sends an alarming signal for checkup and/or replacement of those particular plug-up pipes. After calibration, thermochemical process as described in FIG. 4 can begin.

At step 1702, an output $O_1$ is produced at a first quantity $Q_1$, temperature $T_1$, pressure $P_1$, process agent, $PA_1$, and process flow $PF_1$.

At step 1703, determined if there is a need to change the output. If the answer is no, process 1700 continues with the same output $O_1$ at step 1704. As discussed above, the output of dynamic thermochemical system 400 include syngas, bio-oil, and carbon residues. At step 1705, the pressure is changed if the output is changed. In one embodiment, the pressure can be changed by opening appropriate interconnecting pipes and valves network 9 so that pressure increases in the chamber of the present reactor, i.e., 1B.

At step 1706, after the pressure is changed, a different output $O_3$ is produced. More specifically, when pressure is increased, dynamic thermochemical system 400 produces a higher amount of carbon residues than the initial operating condition specified above.

Figure 18:
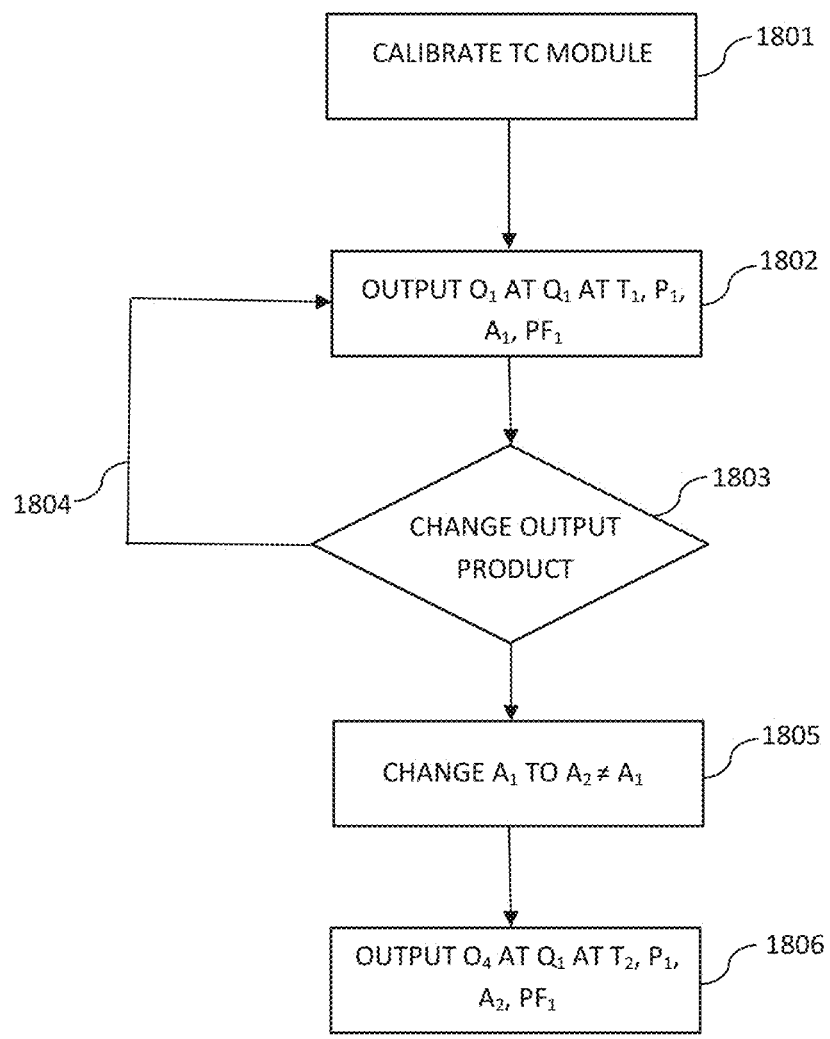
FIG. 18 is a flow chart describing a process of dynamically changing the output by changing the processing agent of a thermochemical system of FIG. 4 in accordance with an embodiment of the present invention.

Next referring to FIG. 18, a flow chart describing a process 1800 of dynamically changing the output by changing the process agent of a thermochemical system in accordance to an embodiment of the present invention is illustrated.

At step 1801, a dynamic thermochemical system is constructed as described in FIG. 4-FIG. 6 and related description above. In one embodiment, dynamic thermochemical system 400 has five different operating parameters. They are quantity, temperature, pressure, process agent, and process flow. In a preferred embodiment, dynamic thermochemical system 400 is calibrated before use for safety and efficiency reasons. More specifically, hot steam is released from steam boiler 6 into each interconnecting pipes and valves network 6. Pressure sensors 830 are checked by controller for possible tar buildup within any pipes. If the measured pressures at any pipes are dropped, the controller sends an alarming signal for checkup and/or replacement of those particular plug-up pipes. After calibration, thermochemical process as described in FIG. 4 can begin.

At step 1802, an output $O_1$ is produced at a first quantity $Q_1$, temperature $T_1$, pressure $P_1$, process agent, $PA_1$, and process flow $PF_1$. For example, the current operation of dynamic thermochemical system 400 uses steam as process agent.

At step 1803, determined if there is a need to change the output. If the answer is no, process 1800 continues with the same output $O_1$ at step 1004. As discussed above, the output of dynamic thermochemical system 400 include syngas, bio-oil, and carbon residues.

At step 1805, the process agent is changed if the output is determined to be changed. In one embodiment, process agent is changed by adding oxygen to steam.

At step 1806, after the process agent is changed to steam and oxygen, a different output $O_4$ is produced. More specifically, when steam and oxygen is used as process agent, dynamic thermochemical system 400 produces a higher amount of syngas, lower amount of bio-oil, and lower amount of carbon residues than the initial operating condition specified above.

Figure 19:
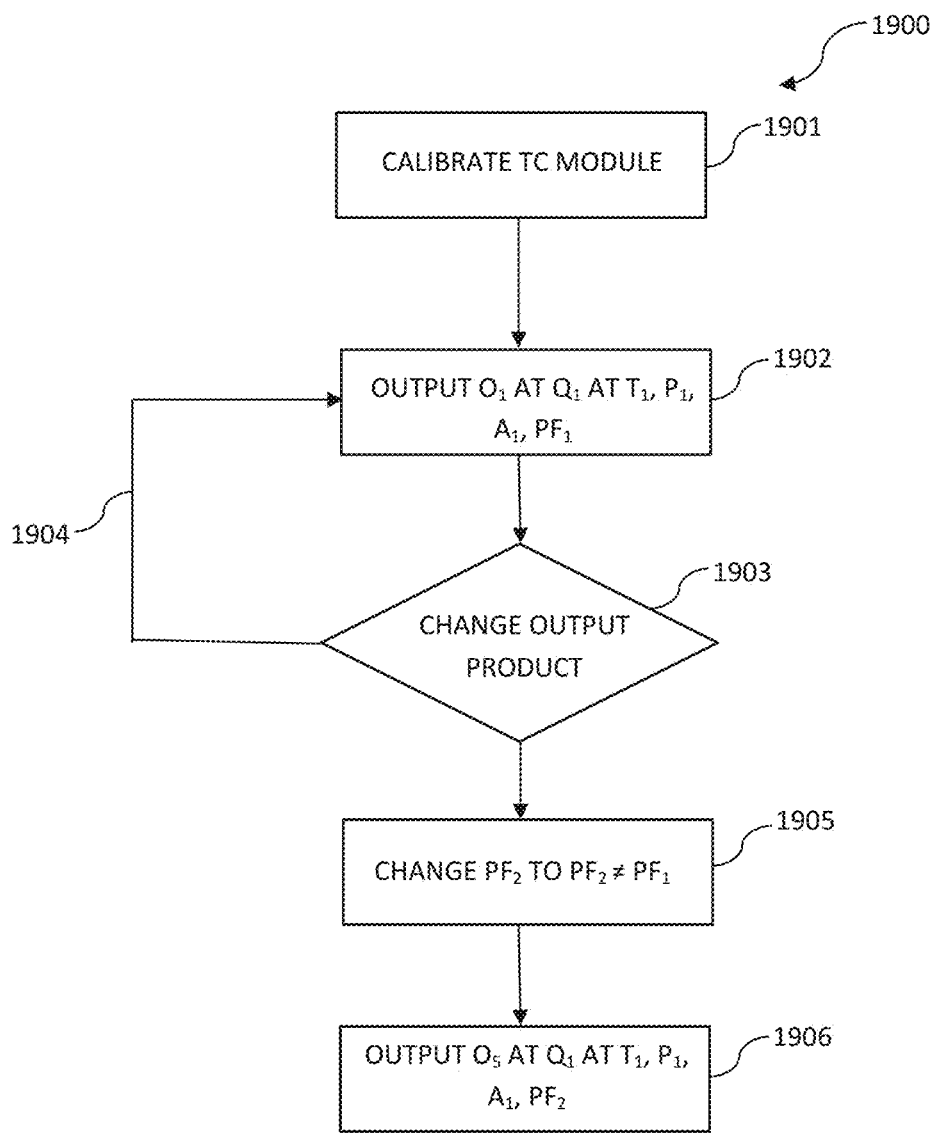
FIG. 19 is a flow chart describing a process of dynamically changing the output by changing the process flow of a thermochemical system of FIG. 4 in accordance with an embodiment of the present invention.

Next referring to FIG. 19, a flow chart describing a process 1900 of dynamically changing the output by changing the process flow of a thermochemical system in accordance to an embodiment of the present invention is illustrated.

At step 1901, a dynamic thermochemical system is constructed as described in FIG. 4-FIG. 6 and related description above. In one embodiment, dynamic thermochemical system 400 have five different operating parameters. They are quantity, temperature, pressure, process agent, and process flow. In a preferred embodiment, dynamic thermochemical system 400 is calibrated before use for safety and efficiency reasons. More specifically, hot steam is released from steam boiler 6 into each interconnecting pipes and valves network 9. Pressure sensors 830 are checked by controller for possible tar buildup within any pipes. If the measured pressures at any pipes are dropped, the controller sends an alarming signal for checkup and/or replacement of those particular plug-up pipes. After calibration, thermochemical process as described in FIG. 4 can begin.

At step 1902, an output $O_1$ is produced at a first quantity $Q_1$, temperature $T_1$, pressure $P_1$, process agent, $PA_1$, and process flow $PF_1$. In the first operating condition, after syngas is produced, it is led to steam reformer, then to WGS to produce enriched hydrogen syngas. Finally, the enriched hydrogen syngas is introduced to pressure swing adsorption to generate pure hydrogen.

At step 1903, determined if there is a need to change the output. If the answer is no, process 1900 continues with the same output $O_1$ at step 1904. As discussed above, the output of dynamic thermochemical system 400 include syngas, bio-oil, and carbon residues.

At step 1905, the process flow is changed if the output is determined to be changed. In one embodiment, the process flow can be changed by opening appropriate interconnecting pipes and valves network 9 so that superheaters 7A-7C and/or by latent heat transferred from previous reactor 1A increase the temperature in the chamber of the present reactor, 1B. Now the syngas with enriched hydrogen is introduced to another reactor 1A-1D to perform hydropyrolysis operation instead of the pressure swing adsorption (PSA).

At step 1906, after the process flow is changed, a different output $O_5$ is produced. More specifically, when the process flow is changed as described in step 1905, dynamic thermochemical system 400 produces a better quality bio-oil.

Figure 20:
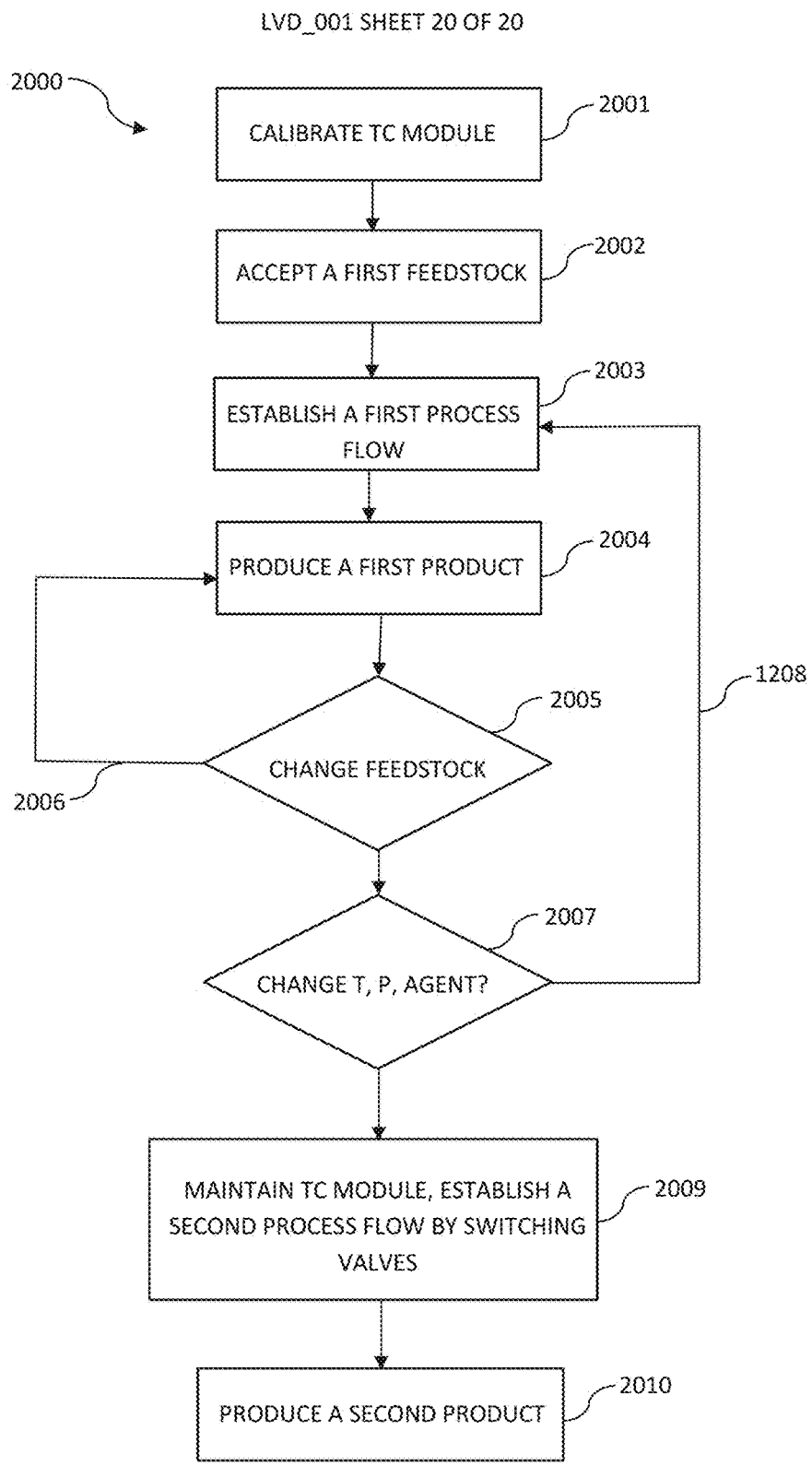
FIG. 20 is a flow chart describing a process of dynamically changing the input feedstock and operating parameters of a thermochemical system of FIG. 4 in accordance with an embodiment of the present invention.

Finally, referring to FIG. 20, a flow chart describing a process 2000 of dynamically changing the input and operating parameters of a thermochemical system in accordance to an embodiment of the present invention is illustrated.

At step 2001, a dynamic thermochemical system is constructed as described in FIG. 4-FIG. 6 and related descriptions above. After that, a calibration or self-test procedure is performed by a controller as described in FIG. 15-FIG. 20 above.

At step 2002, a feedstock is accepted into reactors 1A-1D. For example, the first feedstock is municipal solid waste (MSW).

At step 2003, a first process flow is established. In one embodiment, dynamic thermochemical system 400 has five different operating parameters. They are quantity, temperature, pressure, process agent, and process flow.

At step 2004, a first product including syngas, bio-oil, or carbon residues are produced. In practice, with MSW is used as input, the end products have very low quality because of impurities from the MSW.

At step 2005, after a first produce is made, determined whether a different feedstock is input into reactors. If no, then system 400 continues to produce low quality syngas, bio-oil, and carbon residues at step 2006.

At step 2007, if the input feedstock is changed. In one example, wood chip can be used as input.

At step 2008, operating parameters such as temperature, pressure, process agent, process flow are changed for obtaining different output products. If the answer is no, then go to step 2008 to maintain the first process flow of step 2003.

At step 1209, if the answer is yes, maintain the same thermochemical system without adding anymore reactors or a different module as system 400, change the process as described in FIG. 8-FIG. 11 by switching appropriate interconnecting pipes and valves network 9 and by selecting appropriate reactors, sub-functional reactors, condensers, distributor tanks, steam boiler, etc. using MUX modules.

Finally, at step 2010, a different end product is resulted. For example, bio-oil of high quality will be produced.

In the exemplary embodiment of this invention as described in system 400 and processes 1600 to 2000 above, the combination of multiple reactors 1A-1D, multiple superheaters 7A-7D, multiple sub-functional modules/reactors 3A-3D, multiple condensing modules 4A-4D which preferably to be implemented also as fractional condensing and heat recovery steam generation modules, multiple gas conditioning/storage/distribution modules and multileveled interconnect pipes and controlled valves network 9 which facilitates the interconnection and communication among the above mentioned components as in the exemplary embodiment of system 400 advantageously provides the following features:

a) The capability of volumetric processing as described in the embodiment of system 400, b) The capability to recover and immediate utilization of the latent heat and the sensible heat from the evaporated moisture of the feedstocks in addition to the heat recovery to generate additional steam via the heat exchange with the high temperature processing gases as described in the embodiment of system 400, c) The control of individual stage on-demand and during operation of individual reactor and/or a group of reactors, as described in the embodiment of system 400.

Furthermore, this invention also additionally and advantageously provides:

d) The flexibilities in selecting and operating different process types for individual and/or a group of reactors, as examples without limitation, such as low temperature (LT) pyrolysis, high temperature (HT) pyrolysis, catalytic pyrolysis, hydropyrolysis, gasification, hydrogasification and the like, e) The capability of changing process types and process flows in-process with respect to individual reactor or a group of reactors, as an example without limitation, reactor 1A in system 400 above, instead of going through the drying-LTpyrolysis-HTpyrolysis-gasification stages as described in the embodiment, can go directly from the drying stage to the HT pyrolysis stage simply via the controlled valves of superheater 7B, in parallel, reactor 1B can go directly from the drying stage to the gasification stage via the controlled valves of superheater 7C, f) The capability of selecting and utilizing different sub-functional modules/reactors in-process, as an example without limitation, in the exemplary embodiment of the invention according to system 400, the vapor exits the outlet of reactor 1A during the HT pyrolysis stage can be directed to either the catalytic cracking reactor 3B or hydrotreating reactor 3C simply via the controlled valves in multilevel interconnect pipes and controlled valves network 9 associated with each reactor, g) The independent control of the operation in each reactor coupled with the parallel processing capability of this invention enable the addition of reactors into the implemented system. Thus, the processing capacity of the implemented system according to this invention can be increased as desired without the consequence of increasing the operational severity as in the case of conventional thermochemical processing systems since any reactor in the system can be isolated and taken off-line, i.e. for service, while the remaining reactors in the system still operate as normal. In essence, the up-time of the systems which are implemented according to this invention will be higher than a conventional single reactor thermochemical system, especially for those thermochemical systems with large processing capacity.

h) The capability of utilizing the feedstocks to generate hydrogen or enriched hydrogen gas in-process. As an illustrative example, in the operation of the system 400 as described above, one of the reactor can be used to generate the hydrogen and/or hydrogen enriched gas by directly go to the high temperature pyrolysis or gasification stage after the drying. The syngas output of this reactor is directed to water gas shift sub-functional reactor 3B to enrich the hydrogen component of the syngas by converting the CO component into additional hydrogen component as described above. The exits syngas from the water gas shift reactor, now is enriched with hydrogen and $CO_2$ and also at high temperature, is directed to the inlet of other reactors within system 400 via multileveled interconnect pipes and valves network 9 to perform the partial hydropyrolysis operation for the received reactors.

All of the advantages from this invention contribute to alleviate the challenges and difficulties with respect to the complexity of the feedstocks, the intrinsic mass and heat transfer limitation between feedstocks and process heat in thermochemical processing, and the sequential nature of thermochemical processes in processing carbonaceous feedstocks, in addition to the enhancement of the quality of the produced products and the opportunities to improve the energy efficiency of the implemented systems.

Furthermore, the Independent control of the operation in each reactor coupled with the parallel processing capability of this invention also enables the semi-automated or fully automated operation via software programs in combination with integrated sensors, feedback control loops, and the electrical/electronic controlled valves in the multilevel interconnecting network along with other associated components to facilitate the PLC controlled operation of thermochemical processing systems which are implemented according to this invention.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

DESCRIPTION OF NUMERALS 1A-1D reactors/modules
2A-2D MUX modules
3A-3D sub-functional reactors
4A-4D condensers
8A-8C distribution tanks
5A-5C gas processing/storage/distribution modules 6 steam boiler
7A-7C superheaters
810 controlled valves
820 temperature sensor
830 pressure sensor
1310 reactors of sub-functional tanks
1350 burners
710 inlet section of reactors
711-714 inlet connectors of reactors
720 outlet section of reactors
721-724 outlet connectors of reactors
1401 transceiver/feedback network
1402 AD/DA converter
1403 microcontroller
1140 water level sensor
1150 storage tank
1160 high pressure water pump
9 interconnecting pipes and valves network

What is claimed is:

1. A dynamic thermochemical module, comprising:
an array of reactors;
a network of interconnecting pipes and valves connected to each of said reactor in said array so that every reactor within said array can communicate to one another and other reactors in a different module of the same structure;
a plurality of storage tanks connected to each of said reactor and interconnecting tubes and valves so that an output from each of said reactor is stored therein and distributed to each reactor in said array;
a plurality of sub-functional modules connected to said array of reactors via said network of interconnecting tubes and valves;
a plurality of condensers connected to said array of reactors; and
a plurality of gas conditioning and storage and distribution sub-modules connected to the outputs of said condensers.

2. The dynamic thermochemical module of claim 1 further comprising:
a plurality of heat sources connected to provide heat to each of said reactor and said sub-functional modules in said array; and
a plurality of pressure sources connected to apply pressure to each of said reactor and said sub-functional modules in said array.

3. The dynamic thermochemical module of claim 1 wherein said heat source consists essentially a group of an electrical heating, a super heater, a solar heating, a steam boiler and an indirect and/or direct hot flow of gas.

4. The dynamic thermochemical module of claim 1 wherein said pressure sources consists essentially a group of a compressed air, pressurized oxygen tanks, steam boilers and compressors.

5. The dynamic thermochemical module of claim 2 wherein each of said functional submodules further comprises a catalytic water gas shift reactors following an equation $CO+H_2O \leftrightarrow H_2+CO_2$ for the additional generation of hydrogen (H2) and/or the conditioning of the H2/CO ratio of the produced synthetic gas.

6. The dynamic thermochemical module of claim 2 wherein each of said functional submodules further comprises a Boudouard reactor configured to perform a reaction, $C+CO_2 \leftrightarrow 2CO$.

7. The dynamic thermochemical module of claim 2 wherein each of said sub-functional module further comprises such as a Catalytic Dehalogenator configured to remove halogen, and a catalytic desulphurization reactor which is configured to remove Sulphur.

8. The dynamic thermochemical module of claim 2 wherein each of said sub-functional module further comprises a catalytic steam reformer reactor, or a vapor phase catalytic reactor.

9. The thermochemical module of claim 2 wherein said functional submodules further comprise metal oxide chemical looping reactors.

10. The dynamic thermochemical module of claim 2 wherein said sub-functional modules further comprise a low temperature catalytic hydrodeoxygenation reactor.

11. The dynamic thermochemical module of claim 2 wherein said sub-functional modules further comprise a high temperature catalytic hydrodeoxygenation reactor.

12. The dynamic thermochemical module of claim 2 wherein the temperature ranges from ambient temperature up to 1200° C., and the pressure ranges from at least atmospheric pressure and each of said reactor is configured to accommodate air, pure Oxygen, steam, CO2, or other gases as processing agent.

13. The dynamic thermochemical module system of claim 2 further comprising a plurality of sensors configured to monitor the operating conditions of said thermochemical system.

14. The dynamic thermochemical module of claim 13 further comprising a feedback network configured to monitor the operating conditions of said thermochemical system.

15. The dynamic thermochemical module of claim 14 further comprising a microcontroller configured to control the operation of said thermochemical system using the operation conditions from said plurality of sensors and said feedback network.

16. A process of constructing a thermochemical module, comprising: preparing an array of reactors, a network of interconnecting pipes and distribution tanks connected to each of said reactor in said array so that every reactor in said array can communicate to one another and other reactors in different arrays of reactors, a plurality of storage tanks connected to each of said interconnecting pipes so that an output from each of said reactor is stored therein and distributed to each reactor in said array, a plurality of condensers connected to said array of reactors, and a plurality of sub-functional modules connected to said array of reactors, wherein each of said reactor is operated by temperatures, pressures and processing agents;
producing a first product at a first temperature, a first pressure level and a first processing agent;
determining whether to produce a second product different from said first product;
changing to a second temperature and/or a second pressure level and/or a different processing agent;
determining whether to produce a third product different from said first product and said second product;
changing to a third temperature and a third pressure.

17. The process of claim 16 further comprising a drying process.

18. The process of claim 17 wherein said first product is a synthetic gas and wherein said first temperature is between 300° Celsius to 950° Celsius and said pressure is from the atmospheric pressure to 30 bar.

19. The process of claim 17 wherein said second product is a bio-oil product and wherein said second temperature is between 250° Celsius to 600° Celsius and said pressure is from the atmospheric pressure to 30 bar.

20. The process of claim 17 wherein said third product is carbon residues, and wherein said third temperature is between 250° Celsius to 950° Celsius and said pressure is from the atmospheric pressure to 30 bar.

\* \* \* \* \*